US010531767B2

(12) United States Patent
Freas, II

(10) Patent No.: US 10,531,767 B2
(45) Date of Patent: Jan. 14, 2020

(54) MULTIFUNCTION PROGRAMMABLE FOODSTUFF PREPARATION

(71) Applicant: The Boeing Company, Chicago, IL (US)

(72) Inventor: George Wilson Freas, II, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 458 days.

(21) Appl. No.: 15/238,667

(22) Filed: Aug. 16, 2016

(65) Prior Publication Data

US 2016/0353932 A1 Dec. 8, 2016

Related U.S. Application Data

(63) Continuation-in-part of application No. 14/180,852, filed on Feb. 14, 2014, now Pat. No. 10,206,539.

(51) Int. Cl.
*A47J 43/04* (2006.01)

(52) U.S. Cl.
CPC .................. *A47J 43/04* (2013.01)

(58) Field of Classification Search
CPC . A47J 44/00; A47J 43/04; B01F 15/06; B01F 15/065

(Continued)

(56) References Cited

U.S. PATENT DOCUMENTS

| 4,540,288 A | * | 9/1985 | Pandolfi | A23G 9/12 366/145 |
| 4,649,810 A | * | 3/1987 | Wong | A47J 27/14 222/501 |

(Continued)

FOREIGN PATENT DOCUMENTS

| GB | 2466336 A | 6/2010 |
| JP | 2001211831 A | 8/2001 |

(Continued)

OTHER PUBLICATIONS

"U.S. Appl. No. 14/180,852, Examiner Interview Summary dated Jul. 13, 2018", 3 pages.

(Continued)

*Primary Examiner* — Marc C Howell
(74) *Attorney, Agent, or Firm* — Kwan & Olynick LLP

(57) ABSTRACT

Systems, methods, and devices are disclosed for automatically and programmably preparing food. Devices include a container that includes a cavity configured to store at least one food ingredient, where the cavity defines an internal volume of the container. The devices also include a first plate coupled to a first end of the container, where the first plate includes at least one hole configured to receive the at least one food ingredient. The devices further include a second plate coupled to a second end of the container, and a plurality of thermoelectric devices coupled to the container, where the plurality of thermoelectric devices is configured to exchange thermal energy with the container. The devices also include a first thermal conduit coupled to a first side of each of the plurality of thermoelectric devices, and a second thermal conduit coupled to a second side of each of the plurality of thermoelectric devices.

18 Claims, 20 Drawing Sheets

(58) Field of Classification Search
USPC .................................................. 366/138, 277
See application file for complete search history.

(56) References Cited

U.S. PATENT DOCUMENTS

| | | | |
|---|---|---|---|
| 5,363,746 | A | 11/1994 | Gordon |
| 5,460,209 | A | 10/1995 | Jandura et al. |
| 5,975,366 | A | 11/1999 | Ridgley |
| 6,523,994 | B2 | 2/2003 | Lawson |
| 6,793,387 | B1 | 9/2004 | Neas et al. |
| 10,206,539 | B2 | 2/2019 | Freas, II |
| 2008/0257168 | A1 | 10/2008 | Wolfe |
| 2010/0008180 | A1 | 1/2010 | Krogh |
| 2010/0229572 | A1 | 9/2010 | Raiju et al. |
| 2010/0260005 | A1 | 10/2010 | Bodum |
| 2010/0301042 | A1 | 12/2010 | Kahlert |
| 2011/0116340 | A1 | 5/2011 | Gerl et al. |
| 2015/0230664 | A1 | 8/2015 | Freas, II |

FOREIGN PATENT DOCUMENTS

| | | |
|---|---|---|
| JP | 2003505011 A | 2/2003 |
| JP | 2012217743 A | 11/2012 |
| WO | 0070963 A1 | 11/2000 |

OTHER PUBLICATIONS

"U.S. Appl. No. 14/180,852, Non Final Office Action dated Dec. 8, 2017", 16 pages.

"U.S. Appl. No. 14/180,852, Notice of Allowance dated Jul. 19, 2018", 16 pgs.

"Bartendro—A Cocktail Dispensing Robot", Kickstarter, Retrieved from the Internet: <http://www.kickstarter.com/projects/partyrobotics/bartendro-a-cocktail-dispensing-robot>, Accessed on Feb. 5, 2014, 11 pgs.

"Breadmakershopper.com", The Home Baker, Retrieved from the Internet: <http://breadmakershopper.com/andrew-james/andrew-james-premium-breadmaker-with-automatic-ingredientsnut-and-raisin-dispensera-brand-you-can-trust/,>, Accessed on Feb. 5, 2014, Dec. 2, 2012, 7 pgs.

"Canadian Application Serial No. 2,876,485, Office Action dated Dec. 4, 2015", 3 pgs.

Daugherty, Trevor, "The Yecup 365 travel mug uses your iphone to heat or cool your drink", 9T05Toys, Accessed on Aug. 16, 2016, Retrieved from the Internet: http://9to5toys.com/2016/04/04/yecup-365-travel-mug/, 5 pgs.

"European Application Serial No. 15155226.2, Search Report dated Jun. 1915", 6 pgs.

"Food Printing—"The Killer App" of 3D Printing", 3Ders.org, Retrieved from the Internet: <http://www.3ders.org/articles/20111030-food-printing-the-killer-app-of-3d-printing.html>, Accessed on Feb. 5, 2014, Oct. 30, 2011, 9 pgs.

Garfield, Leanna, "MIT students invented a robotic kitchen that could revolutionize fast food", Tech Insider, Apr. 18, 2016, Retrieved from the Internet: http://www.techinsider.io/mit-students-invented-a-robotic-kitchen-2016-4, 5 pgs.

"Moley", Retrieved from the Internet: http://moley.com/#, Accessed on May 28, 2015, 11 pgs.

"Real-life Star Trek 'replicator' makes meals in 30 seconds", Retrieved from the Internet: http://www.metro.us/lifestyle/real-life-star-trek-replicator-makes-meals-in-30-seconds/zsJoel---bGrbNRIDR5izk/, Accessed on May 15, 2015, 2 pgs.

"Seville", DarenthMJS Ltd., Retrieved from the Internet: <http://www.darenthmjs.com/seville/>, Accessed on Feb. 5, 2014, 2014, 2 pgs.

"The Coming Food Printer Revolution", FuturistSpeaker.com, Retrieved from the Internet: <http://www.futuristspeaker.com/2011/10/the-coming-food-printer-revolution/http://www.futuristspeaker.com/2011/10/the-coming-food-printer-revolution/>, Accessed on Feb. 5, 2014, Oct. 4, 2011, 16 pgs.

Templeton, Graham, "NASA funds 3D food printer, to combat hunger in space and on Earth", ExtremeTech, Retrieved from the Internet: <http://www.extremetech.com/extreme/156355-nasa-funds-3d-food-printer-to-combat-hunger-in-space-and-on-earth>, Accessed on Feb. 5, 2014, May 21, 2013, 4 pgs.

"U.S. Appl. No. 14/180,852, Non Final Office Action dated Dec. 14, 2016", 15 pages.

"U.S. Appl. No. 14/180,852, Restriction Requirement dated Sep. 22, 2016", 7 pages.

"U.S. Appl. No. 14/180,852, Final Office Action dated Jun. 26, 2017", 19 pgs.

"U.S. Appl. No. 14/180,852, Advisory Action dated Sep. 14, 2017", 3 pgs.

"Japanese Application Serial No. 2015-016364, Office Action dated Jan. 22, 2019", 13 pgs.

* cited by examiner

MULTIFUNCTION PROGRAMMABLE FOODSTUFF PREPARATION

CROSS-REFERENCE TO RELATED APPLICATIONS

This application is a continuation-in-part of U.S. application Ser. No. 14/180,852, filed Feb. 14, 2014, which is incorporated by reference herein in its entirety.

TECHNICAL FIELD

This disclosure generally relates to food preparation methods and devices and, more specifically, to food preparation methods and devices which may be programmable and substantially automated.

BACKGROUND

Food ingredient dispensers and preparation devices typically have separate chambers for mixing ingredients and heating ingredients. More specifically, ingredients may be mixed in a first vessel and subsequently transferred to an oven to create the final food product. For example, in commercial food factories, large hoppers of ingredients deliver ingredients into a mixer. After the ingredients are mixed, the mixture is transferred to an oven or cooler to make the final food product. As such, conventional ingredient dispensers and mixers remain limited because they may require the use of multiple containers or vessels during the preparation of food. Moreover, conventional ingredient dispensers and mixers typically cannot operate in low or zero-gravity environments (e.g., the International Space Station (ISS)). Further still, conventional ingredient dispensers and mixers often require user intervention, and are not substantially automated.

SUMMARY

Disclosed herein are systems, methods, and devices for automatically and programmably preparing food. Devices may include a container that includes a cavity configured to store at least one food ingredient, where the cavity defines an internal volume of the container. The devices may also include a first plate coupled to a first end of the container, where the first plate includes at least one hole configured to receive the at least one food ingredient. The devices may further include a second plate coupled to a second end of the container, and a plurality of thermoelectric devices coupled to the container, where the plurality of thermoelectric devices is configured to exchange thermal energy with the container. The devices may also include a first thermal conduit coupled to a first side of each of the plurality of thermoelectric devices, and a second thermal conduit coupled to a second side of each of the plurality of thermoelectric devices.

In some embodiments, the first thermal conduit is coupled to the first side of each of the plurality of thermoelectric devices via a first plurality of thermal transfer devices, the second thermal conduit is coupled to the second side of each of the plurality of thermoelectric devices via a second plurality of thermal transfer devices, the first side faces towards the container, and the second side faces away from the container. In various embodiments, the plurality of thermoelectric devices includes a plurality of Peltier devices. According to some embodiments, the first thermal conduit is configured to exchange thermal energy with at least the first side of each of the plurality of thermoelectric devices, the second thermal conduit is configured to exchange thermal energy with at least the second side of each of the plurality of thermoelectric devices. In various embodiments, the first thermal conduit is configured to circulate a fluid, the first thermal conduit is coupled to a first pump, the second thermal conduit is configured to circulate a fluid, and the second thermal conduit is coupled to a second pump.

In some embodiments, the devices also include control circuitry operatively coupled to the plurality of thermoelectric devices. In various embodiments, the control circuitry is configured to control the plurality of thermoelectric devices based, at least in part, on a first amount of energy associated with the device and a second amount of energy associated with another vehicle component. In particular embodiments, the first thermal conduit is coupled to a first thermal pathway, and the second thermal conduit is coupled to a second thermal pathway. In some embodiments, the first thermal pathway and the second thermal pathway are coupled with at least one of a group consisting of: an environmental system, a payload area, a cryogenic system, an air exchanger, an avionics fan, and an air handler. In various embodiments, the device is included on a spacecraft.

Also disclosed herein are systems for preparing food that may include a first programmable food preparing device that may further include a first container including a first cavity defining a first internal volume of the first container. The first programmable food preparing may also include a first plurality of plates bounding the first internal volume of the first container and including at least one hole configured to receive at least one food ingredient. The first programmable food preparing may also include a first plurality of thermoelectric devices coupled to the container and configured to exchange thermal energy with the container. The first programmable food preparing may further include a first plurality of thermal conduits coupled to a first side and a second side of each of the plurality of thermoelectric devices. In some embodiments, the systems may also include a second programmable food preparing device that may further include a second container including a second cavity defining a second internal volume of the second container. The second programmable food preparing device may further include a second plurality of plates bounding the second internal volume of the second container and including at least one hole configured to receive at least one food ingredient. The second programmable food preparing device may also include a second plurality of thermoelectric devices coupled to the container and configured to exchange thermal energy with the container. The second programmable food preparing device may further include a second plurality of thermal conduits coupled to a third and fourth side of each of the second plurality of thermoelectric devices.

In some embodiments, the first plurality of thermal conduits includes a first thermal conduit and a second thermal conduit, the second plurality of thermal conduits includes a third thermal conduit and a fourth thermal conduit. In various embodiments, the first thermal conduit is configured to circulate heated fluid, the second thermal conduit is configured to circulate cooled fluid, the third thermal conduit is configured to circulate cooled fluid, and the fourth thermal conduit is configured to circulate heated fluid. In some embodiments, the first thermal conduit is coupled to the fourth thermal conduit in series in a first thermal pathway, and the second thermal conduit and the third thermal conduit are coupled in series in a second thermal pathway.

According to various embodiments, the first thermal pathway is provided to a first spacecraft component, and the second thermal pathway is provided to a second spacecraft component.

Further disclosed herein are methods that may include receiving at least one food ingredient in a container including a cavity configured to store a plurality of food ingredients. The methods may also include thermally regulating the at least one food ingredient based on a plurality of food preparation operations identified based on a received recipe selection, where the regulating uses a plurality of thermoelectric devices coupled to the container. The methods may also include transferring a heated fluid along a first thermal pathway including a first thermal conduit coupled to a first side of each of the plurality of thermoelectric devices, and transferring a cooled fluid along a second thermal pathway including a second thermal conduit coupled to a second side of each of the plurality of thermoelectric devices.

In various embodiments, the first thermal conduit is coupled to the first side of each of the plurality of thermoelectric devices via a first plurality of thermal transfer devices, the second thermal conduit is coupled to the second side of each of the plurality of thermoelectric devices via a second plurality of thermal transfer devices, the first side faces towards the container, and the second side faces away from the container. In some embodiments, the plurality of thermoelectric devices includes a plurality of Peltier devices. In various embodiments, the methods further include providing the heated fluid to a first vehicle component, and providing the cooled fluid to a second vehicle component. In some embodiments, the first and second vehicle component are included in one of a group consisting of: an environmental system, a payload area, a cryogenic system, an air exchanger, an avionics fan, and an air handler.

DETAILED DESCRIPTION

Figure 1:
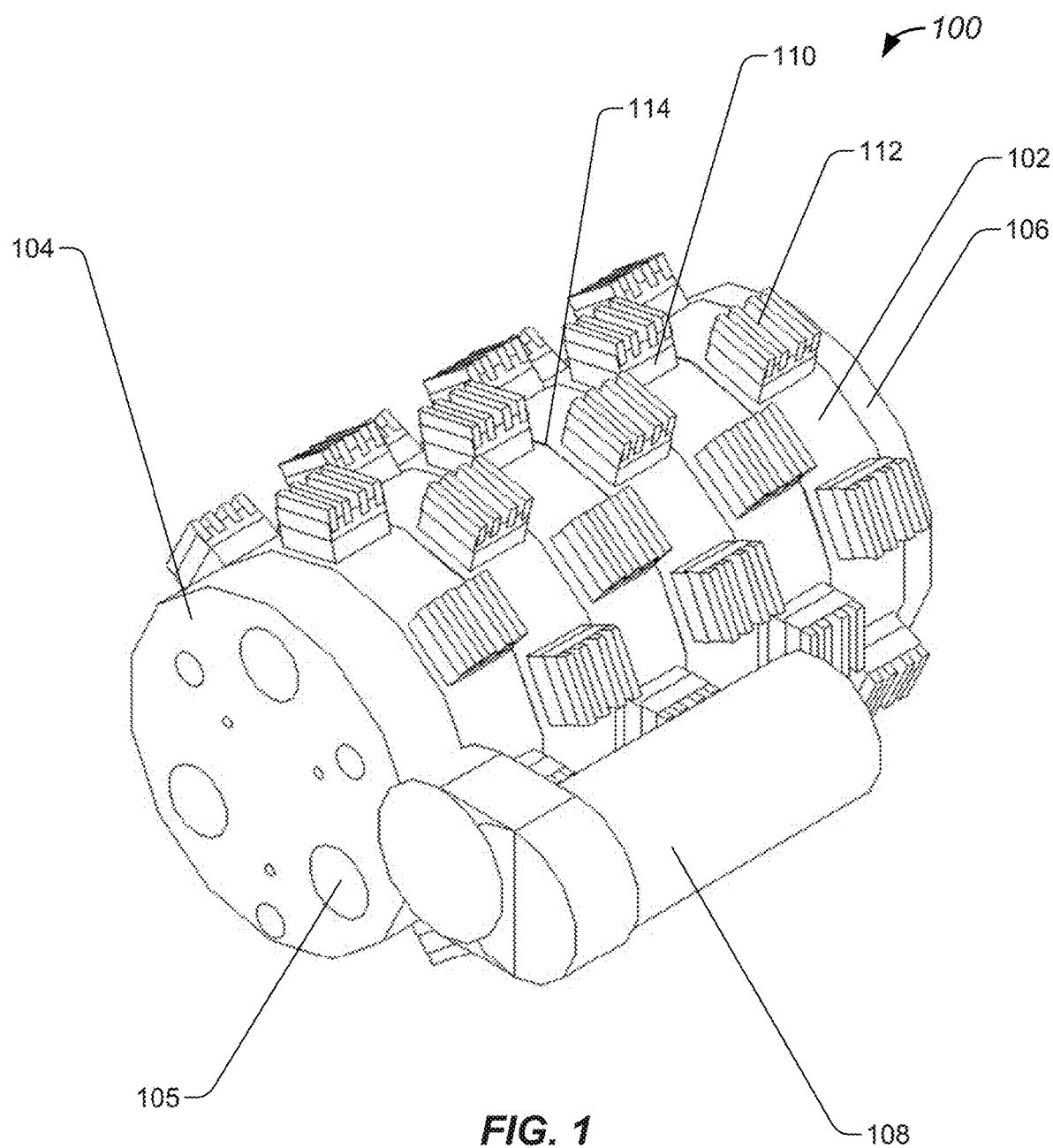
FIG. 1 illustrates an example of a programmable food preparation device configured to automatically prepare food, implemented in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

As previously discussed, conventional ingredient dispensers typically have separate chambers for mixing ingredients and heating ingredients. Thus, conventional ingredient dispensers typically require additional equipment and additional processing steps which may result in a longer food preparation process which occupies more resources. Moreover, the additional equipment may be relatively bulky and might not be suitable for deployment in an aircraft or spacecraft. Furthermore, conventional ingredient dispensers and mixers typically cannot operate in low or zero-gravity environments (e.g., the International Space Station (ISS)) because they do not provide the ability to effectively and reliably introduce ingredients and evacuate the mixture once complete in the absence of gravity.

Various systems, methods, and devices disclosed herein may provide the substantially automated preparation of food and foodstuffs in terrestrial and extraterrestrial contexts. In some embodiments, a terrestrial context may refer to or describe environments on or near the ground or at altitudes in which gravity pulls the prepared food toward the ground. Accordingly, a terrestrial context or environment may include buildings (residential or commercial) or aircraft (e.g., as part of the galley). Moreover, an extraterrestrial context may refer to an environment in which food is not pulled in a particular direction by gravity. For example, an extraterrestrial context or environment may include a spacecraft or space station. As disclosed herein, several food ingredients may be mixed and thermally regulated in a single chamber or container. Thus, the entire process of preparing the food may occur in a single container, and the final food product may be subsequently dispensed for consumption by users, such as a flight crew. In some embodiments, a computer system may automate and implement substantially all steps of the preparation of the food. Moreover, various components of food preparation devices disclosed herein may be configured such that the prepared food product may be effectively and reliably dispensed regardless of whether or not a gravitational force acts upon the prepared food.

Various systems, methods, and devices are also disclosed herein that provide thermal coupling between programmable food preparation devices and other components that may be implemented in a vehicle or environment such as an aircraft, spacecraft, or space station. As will be discussed in greater detail below, various embodiments disclosed herein may be configured and implemented such that the heating and cooling of components and ingredients during cooking operations may also be used to heat and cool other portions of aircraft and spacecraft. In this way, programmable food preparation devices may be integrated with environmental systems as well as other systems to increase the efficiency of environmental regulation of such systems. More specifically, heating and cooling operations associated with the programmable food preparation devices may also be used to heat and cool other components and systems such as environmental systems, payload areas, cryogenic systems, air exchangers, avionics fans, and air handlers. In this way, the heating and cooling of food preparation devices may be implemented to efficiently and effectively heat and/or cool other vehicle or space station components as well, thus increasing the overall efficiency of energy usage within the vehicle or space station.

FIG. 1 illustrates an example of a programmable food preparation device configured to automatically prepare food, implemented in accordance with some embodiments. Food preparation device 100 may automatically deliver predetermined amounts of food ingredients into a container, such as container 102. In the container, the food ingredients may be mixed and thermal energy may be exchanged with the food ingredients. In this way, the mixture of food ingredients is not transferred from the container until the final food product is finished. As similarly discussed above, food preparation device 100 may be used terrestrially or extra-terrestrially. Thus, food preparation device 100 may be used to automatically prepare food in the presence or absence of a gravitational force. As will be discussed in greater detail below, one or more components of food preparation device 100 may be configured based on whether the operational environment of food preparation device 100 will be terrestrial or extra-terrestrial.

Food preparation device 100 may include container 102 which may be configured to receive and store one or more food ingredients. In some embodiments, container 102 may include a cavity that defines an internal volume of container 102. For example, container 102 may be substantially hollow and have an internal volume that is a cylindrical cavity. Accordingly, as shown in FIG. 1, container 102 may have a substantially cylindrical shape. It will be appreciated that container 102 may be configured to have any suitable geometry. For example, container 102 may have a hexagonal, octagonal, or square geometry. In various embodiments, container 102 may be made of a material that is thermally and electrically conductive. For example, container 102 may be made of a metal such as aluminum or stainless steel. In some embodiments, a relatively light metal, such as aluminum, may be preferable for aerospace applications.

In some embodiments, an internal volume of container 102 may be bounded by one or more plates. For example, container 102 may be coupled with first plate 104 and second plate 106. In some embodiments, each of first plate 104 and second plate 106 may be removably coupled with container 102 such that, when coupled, an air and water tight seal is formed between each plate and container 102, thus sealing the internal volume of container 102. Moreover, when decoupled, the plates and container 102 may be disassembled into separate pieces, as may be appropriate during one or more cleaning operations. In some embodiments, first plate 104 and second plate 106 may be removably coupled to container 102 via a hinge or mechanical lock, and a seal may be established via the use of one or more gaskets that line the interface between container 102 and each of first plate 104 and second plate 106.

In various embodiments, first plate 104 and/or second plate 106 may include one or more ports or holes, such as hole 105. The ports or holes may be configured to provide access to the internal volume of container 102. For example, holes included in first plate 104 may be configured to mechanically couple with food receptacles which may include one or more food ingredients. For example, a particular recipe may include two food ingredients, where each food ingredient may be prepackaged in a separate food receptacle or container. Each food receptacle may be coupled with a hole in first plate 104 via, for example, a threaded screw mount. In this way, the prepackaged food receptacles that include the ingredients of the recipe may be coupled with food preparation device 100, and the food ingredients may be introduced into the internal volume of container 102.

Moreover, the holes may be configured to be coupled with other components and/or systems associated with or included in food preparation device 100. For example, a hole, such as hole 105, may be configured to be coupled with an exhaust hose which may be used to vent gasses which may form during the preparation of the food. In another example, the hole may be configured to be coupled with one or more hoses of a cleaning system which may be used to provide soap and water during one or more cleaning operations. Furthermore, one or more holes in second plate 106 may be configured to be coupled with one or more hoses of an evacuation system which may be used to evacuate the contents of container 102 after the preparation of the food is complete. For example, the evacuation system may include a vacuum pump that is configured to apply suction to the internal volume of container 102, and move the contents of container 102 to another vessel or container which may be used to serve the food. In some embodiments, each of the holes may include a cover that is configured to seal the hole when not in use. For example, a cover may be a metal screw cover that screws onto a threaded portion of a hole, such as hole 105.

Food preparation device 100 may also include motor 108 which may include an electric motor and an associated drive train. In various embodiments, motor 108 may be electrically coupled to an external power source. Furthermore, motor 108 may be mechanically coupled to a mixing device, which may be included in and positioned within the internal volume of container 102, as discussed in greater detail below with reference to FIG. 3A and FIG. 3B. Motor 108 may further include hardware and software configured to communicate with a computer system, which may be an external computer system, via a communications interface. As will be discussed in greater detail below with reference to FIG. 5 and FIG. 6, the computer system may include a computer control program that, when executed, provides one or more instructions to food preparation device 100, and may control operation of motor 108.

In some embodiments, food preparation device 100 may include at least one thermoelectric device 110. As shown in FIG. 1, food preparation device 100 may include several thermoelectric devices which may be configured to control and regulate a temperature of food preparation device 100 and a temperature of the internal volume of container 102. In some embodiments, the thermoelectric devices may be configured to change temperature in response to the application of an electrical current to the thermal electric devices. For example, a thermoelectric device, such as thermoelectric device 110, may cause a first change in temperature in response to a first current passing through the thermoelectric device in a first direction, and may cause a second change in temperature in response to a second current passing through the thermoelectric device in a second direction. Thus, thermoelectric device 110 may be configured to increase a temperature and transfer heat to container 102 in response to the application of a first current to thermoelectric device 110. Moreover, thermoelectric device 110 may be further configured to decrease a temperature and remove heat from container 102 in response to the application of a second current. In this way, thermoelectric device 110 may exchange thermal energy with container 102, and may heat or cool container 102 and its internal volume based on the application of one or more currents to thermoelectric device 110. In some embodiments, an example of such a thermoelectric device may be a Peltier device, or any other suitable device capable of generating a heating or cooling effect responsive to different currents and/or voltages. Furthermore, thermoelectric devices, such as thermoelectric device 110, may include additional types of heating or cooling devices, such as heat strips and heating plates, to further enhance the heating and cooling capabilities of food preparation device 100.

In various embodiments, each of the thermoelectric devices may be electrically coupled to one or more current sources which may be configured to control the current applied to each of the thermoelectric devices. The current source may be an external current source and may be configured to determine a current applied to the thermoelectric devices based on a computer control program associated with the recipe that is being prepared, and also based on data or information provided by the thermoelectric devices themselves. As is discussed in greater detail below with reference to FIG. 5 and FIG. 6, a computer control program may identify one or more food preparation operations, such as heating one or more food ingredients to a particular temperature. The computer control program may be executed by a computer system which may be communicatively coupled to the current source and cause the current source to apply a current to the thermoelectric devices, thus heating the contents of container 102. While a current source has been described, it will be appreciated that a voltage source may be used as well.

In some embodiments, one or more temperature sensors may be included in food preparation device 100 that provide feedback to the computer system and current source. In some embodiments, the temperature sensors may be included within the thermoelectric devices, or may be embedded within a wall of container 102. The temperature sensors may be communicatively coupled to the computer system and/or current source via a communications interface. The temperature sensors may be configured to periodically or dynamically measure the temperature of the contents of container 102 and provide the measured temperature data to the computer system and/or current source. In this way, the computer system and/or current source may be provided with feedback regarding the temperature of the contents of container 102, and may cease the application of a current once a target temperature has been achieved, or may apply a current if a range from a target temperature has been exceeded.

According to some embodiments, additional cooling devices may be coupled to the thermoelectric devices. For example, at least one cooling device 112 may be coupled to each thermoelectric device 110. In this example, cooling device is a metal heat sink, which may be made of copper, that is air cooled by an external air circulation system. In some embodiments, a liquid cooling device or system may be coupled to the thermoelectric devices and may circulate a coolant, which may be water, through a series of tubes or pipes to facilitate the cooling of the thermoelectric devices.

In various embodiments, food preparation device 100 may include several telemetry devices which may be configured to monitor and report positional data about one or more components included within food preparation device 100. For example, food preparation device 100 may include a telemetry device, such as telemetry device 114, which may be a coil of conductive wire that is wrapped around container 102. The coil of wire may be localized to a particular portion or region of container 102. In this example, the coil of wire included in telemetry device 114 may be configured to detect local magnetic distortions which may be caused by the movement of one or more components of a mixing device. For example, as will be discussed in greater detail below with reference to FIGS. 3A and 3B, a mixing device may include one or more components, such as a mixing blade. The mixing blade may be configured to move within an internal volume of container 102 in any suitable way. For example, the mixing blade may move between first plate 104 and second plate 106. Such movement may be rotational, longitudinal, or a combination of rotational and longitudinal movement within the internal volume of container 102. The mixing blade may include one or more permanent magnets. When the mixing blade is near telemetry device 114, the rotation and proximity of the mixing blade may cause a change in magnetic field applied to telemetry device 114, and induce a current through the coil of wire included in telemetry device 114. The spacing of the telemetry devices and the strength of the permanent magnets may be configured such that the presence of the mixing blade is detected by only a single telemetry device at a time. In various embodiments, telemetry device 114 may be coupled to a computer system via a communications interface. The induced current may be provided to the computer system as an input that identifies the telemetry device reporting the signal and also indicates that the mixing blade has been detected. In this way, the computer system may determine the position or location of the mixing blade within container 102 based on a signal received from a telemetry device.

Figure 2:
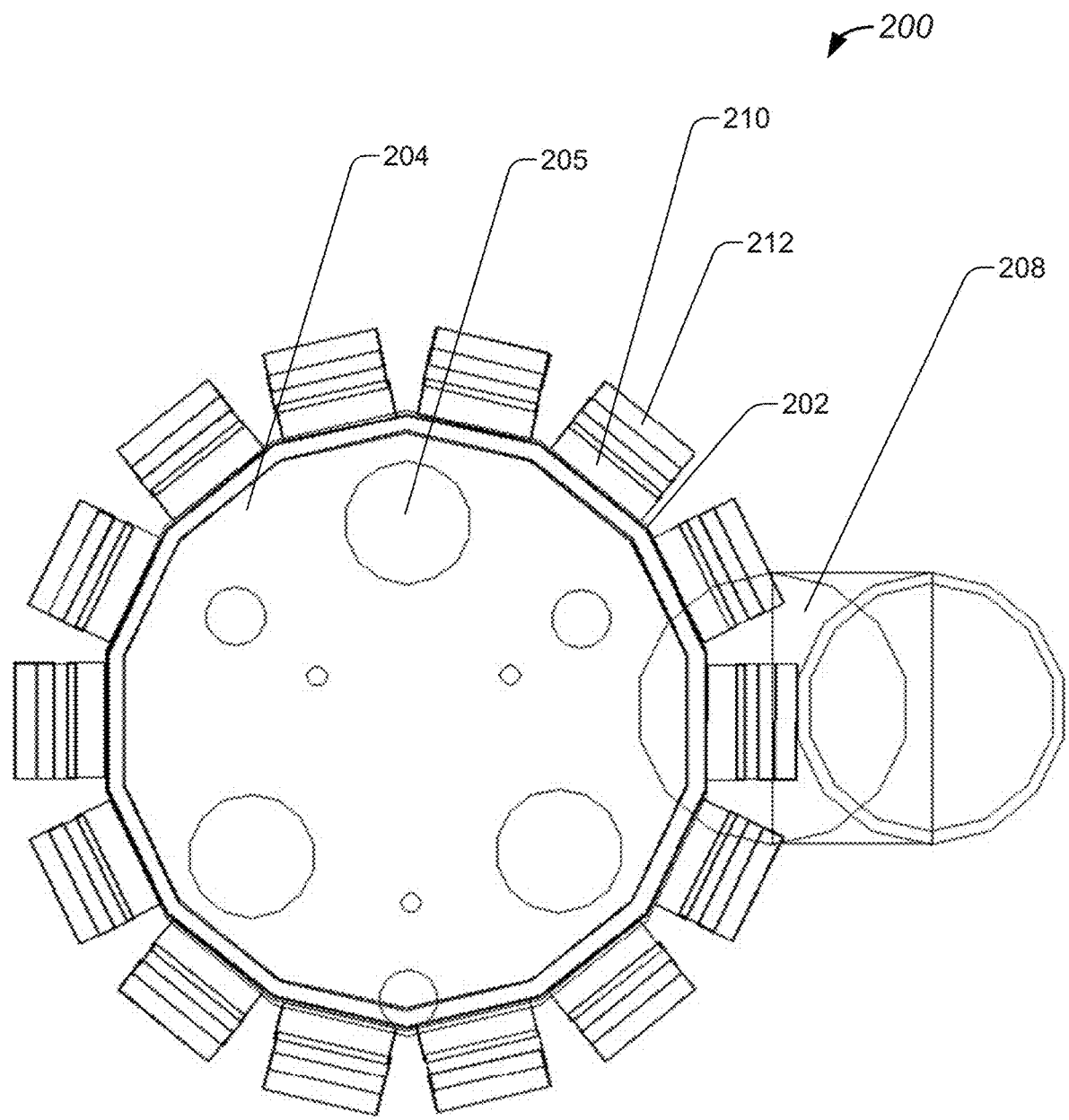
FIG. 2 illustrates a top view of an example of a programmable food preparation device configured to automatically prepare food, implemented in accordance with some embodiments.

FIG. 2 illustrates a top view of an example of a programmable food preparation device configured to automatically prepare food, implemented in accordance with some embodiments. As discussed above with reference to FIG. 1, food preparation device 200 may include container 202, first plate 204, hole 205, motor 208, thermoelectric device 210, and cooling device 212. As shown in FIG. 2, the overall geometry of food preparation device 200 may be substantially cylindrical. In some embodiments, sides of food preparation device 200 and container 202 may be beveled to provide a flat contact surface for one or more thermoelectric devices, such as thermoelectric device 210. Accordingly, food preparation device 200 and container 202 may be configured to have a number of sides determined based on a number of thermoelectric devices included in food preparation device 200. Furthermore, a size, geometry, and dimension of each side may be configured based on the geometry of the thermoelectric devices. In this example, fourteen substantially square thermoelectric devices are included. Accordingly, container 202 of food preparation device 200 includes fourteen sides, each beveled to provide a flat contact area with the thermoelectric devices. Moreover, holes included in a plate, such as hole 205 included in first plate 204, may be arranged in various suitable configurations. For example, holes included in first plate 204 may be arranged in concentric rings, thus leaving a central attachment point for a mixing blade of a mixing device, as discussed in greater detail below with reference to FIG. 3A and FIG. 3B.

Figure 3A:
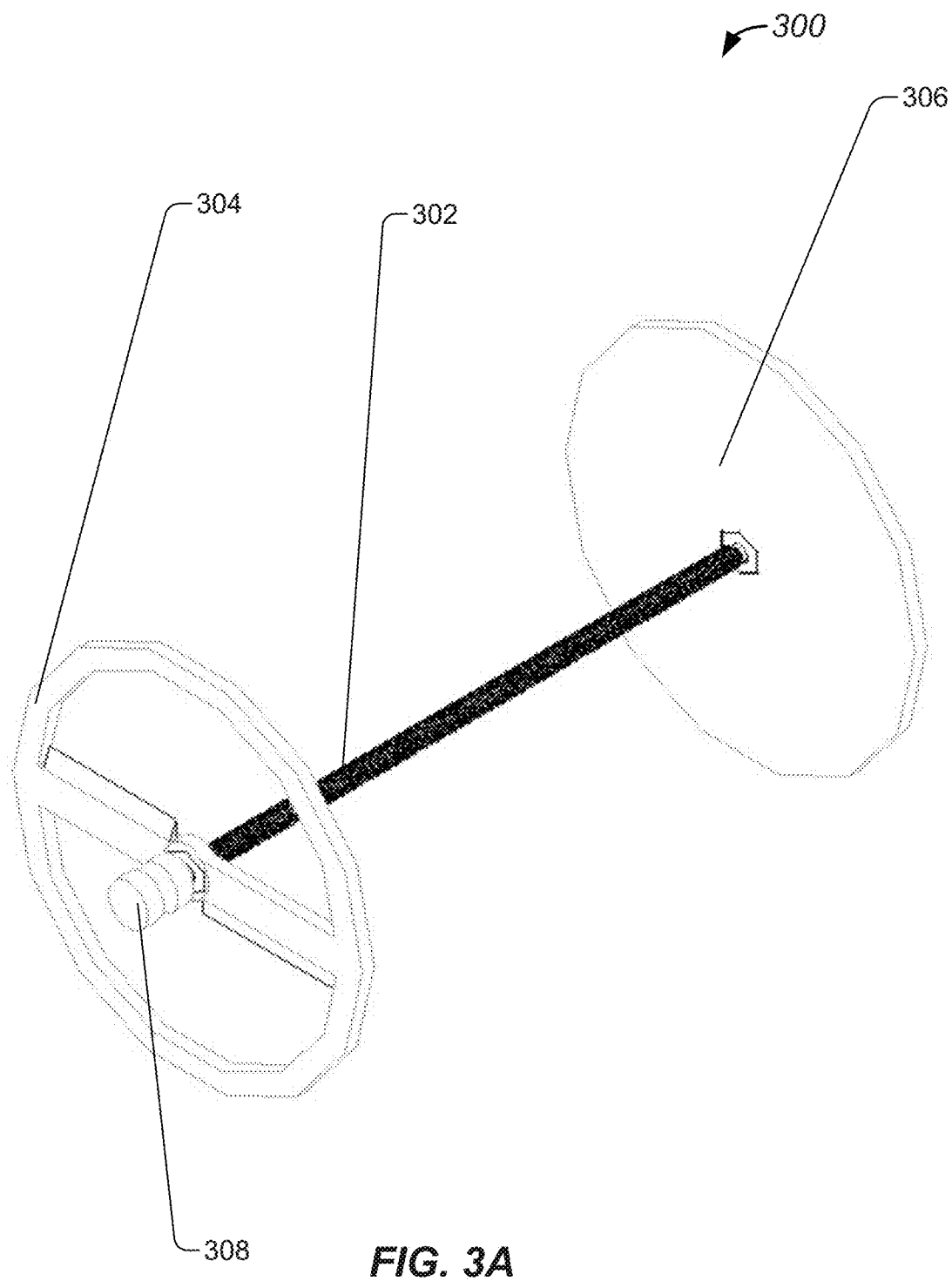
FIG. 3A illustrates an example of one or more components of a mixing device that may be included in a food preparation device, implemented in accordance with some embodiments.

FIG. 3A illustrates an example of one or more components of a mixing device that may be included in a food preparation device, implemented in accordance with some embodiments. As discussed above with reference to FIG. 1, a food preparation device may include a mixing device, such as mixing device 300. In some embodiments, mixing device 300 may include threaded shaft 302, mixing blade 304, plunger disc 306, and attachment point 308. According to some embodiments, threaded shaft 302 may function as a central transport screw and may be mechanically coupled to a motor to rotate in either a clockwise or counter-clockwise direction. Furthermore, mixing blade 304 and plunger disc 306 may include threaded through-holes which mate with threaded shaft 302 such that rotation of threaded shaft 302 may cause movement of mixing blade 304 and/or plunger disc 306 when they are threaded. In this way, threaded shaft 302 may be rotated to move and rotate mixing blade 304 and mix the contents of a container of a food preparation device, such as container 102 discussed above with reference to FIG. 1. Furthermore, threaded shaft 302 may be rotated to move plunger disc 306 towards an end of the container to force the contents of the container out of the container via one or more holes in a plate. Thus, in an extra-terrestrial operational environment where there is little to no gravitational force, plunger disc 306 may force the contents of the container out of the container and into another container or vessel.

In some embodiments, mixing device 300 may selectively move mixing blade 304 and plunger disc 306 independently or together. For example, mixing device 300 may include a positioning actuator that may be configured to adjust a position of threaded shaft 302 to determine which, if any of mixing blade 304 and plunger disc 306 are engaged and moved by the rotation of threaded shaft 302. For example, the screw positioning actuator may have a first position in which neither mixing blade 304 nor plunger disc 306 are threaded or engaged. In this example, both mixing blade 304 and plunger disc 306 may be nested at one end of the container, and threaded shaft 302 might not be in contact with their respective threaded through-holes. Furthermore, the positioning actuator may have a second position in which only mixing blade 304 is threaded by threaded shaft 302 and is rotationally engaged. In this instance, the position of threaded shaft 302 may be adjusted or moved along an axis of the container such that threaded shaft 302 contacts and threads the through-hole of mixing blade 304, but does not contact and thread the through-hole of plunger disc 306. Further still, the positioning actuator may have a third position in which both mixing blade 304 and plunger disc 306 are threaded by threaded shaft 302 and are engaged. In this instance both mixing blade 304 and plunger disc 306 may be moved along the length of the container, and plunger disc 306 may force the prepared food out of the container.

In some embodiments, through-hole of mixing blade 304 may be enclosed in a collar bearing, which may be coupled on its outer surface to mixing blade 304. Additionally, the through-hole of plunger disc 306 may be similarly configured and may also be enclosed in a collar bearing. Thereby, when threaded shaft 302 is rotationally engaged to mixing blade 304 or plunger 306, mixing blade 304 and plunger 306 may rotate independently of threaded shaft 302. Moreover, mixing blade 304, plunger 306, or both may be constrained to a particular mixing path by engaging a pin rod (or another similar device) perpendicular to the tangent of the circular edge of mixing blade 304 or plunger 306. The pin rod may be engaged with a channel groove cut in the interior wall of container 102. Thus, when threaded shaft 302 needs to be rotationally engaged to either mixing blade 304, plunger 306, or both, the pin rod is engaged with the channel groove causing the rotation of mixing blade 304, plunger 306, or both along a predefined path. Additionally, the rotational speed of threaded shaft 302 may be varied to modify or change an effect of the rotational force onto mixing blade 304. For example, a motor coupled to threaded shaft 302 may have a low rotation per minute (RPM) setting and a high RPM setting. In this way, the rotational speed of threaded shaft 302 may be varied to cause mixing blade 304 to mix the contents of container 102 in either a slow manner or a more vigorous manner.

Figure 3B:
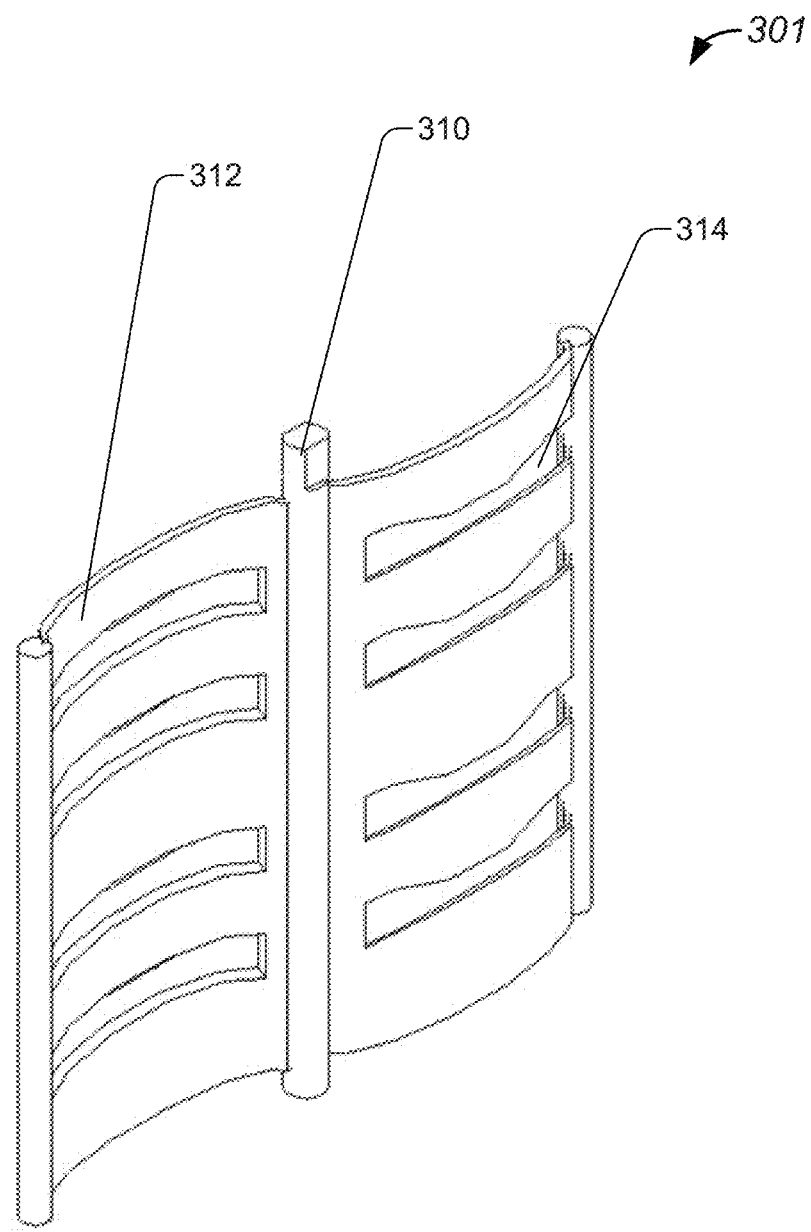
FIG. 3B illustrates another example of one or more components of a mixing device that may be included in a food preparation device, implemented in accordance with some embodiments.

FIG. 3B illustrates another example of one or more components of a mixing device that may be included in a food preparation device, implemented in accordance with some embodiments. As shown in FIG. 3B, mixing device 301 may include central shaft 310 and mixing blade 312, which may include a number of holes, such as hole 314. In some embodiments, central shaft 310 may be coupled to a motor which may cause central shaft to rotate, as well as mixing blade 312 which may be coupled to or integrated with central shaft 310. Accordingly, mixing blade 312 may be rotated and mix the internal contents of a food preparation device which may include a container, such as container 102 discussed with reference to FIG. 1. In some embodiments, mixing device 301 may be used in terrestrial operational conditions. Accordingly, a gravitational force may be used to remove contents of the container upon completion of preparation of the food.

Figure 3C:
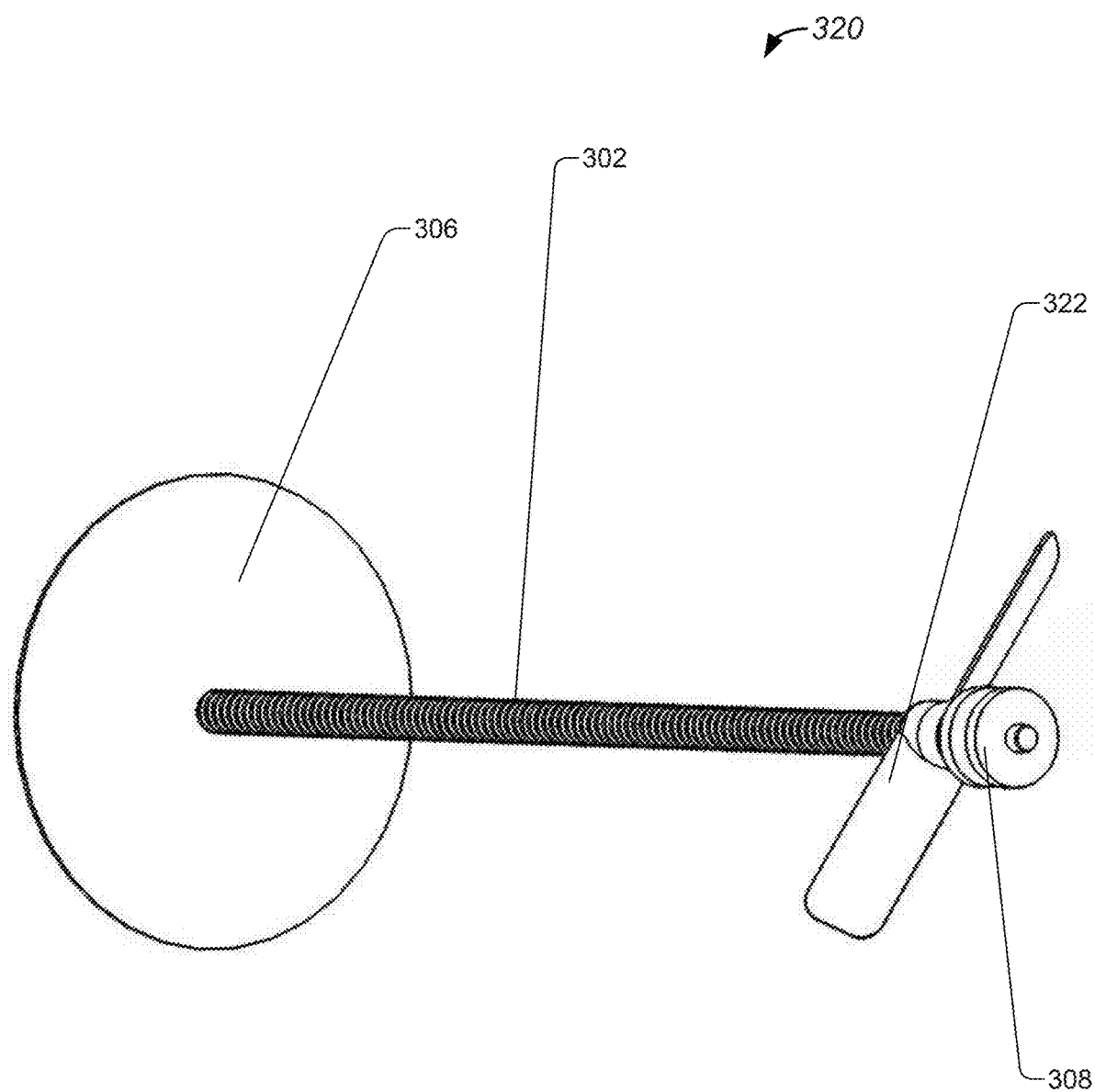
FIG. 3C illustrates an additional example of one or more components of a mixing device that may be included in a food preparation device, implemented in accordance with some embodiments.

FIG. 3C illustrates an additional example of one or more components of a mixing device that may be included in a food preparation device, implemented in accordance with some embodiments. As similarly discussed above with reference to FIG. 3A, mixing device 320 may include threaded shaft 302, plunger disc 306, and attachment point 308. As further illustrated in FIG. 3C, mixing device 320 may also include mixing blade 322 which may have a propeller-style shape or geometry and may be coupled with threaded shaft 302. Accordingly, as similarly discussed above, rotation of threaded shaft 302 may cause rotation of mixing blade 322 as well as a change in a position of mixing blade 322 along threaded shaft 302, thus enabling the mixing of contents within a container, such as container 102. As similarly discussed above, a motor coupled to threaded shaft 302 may have a low rotation per minute (RPM) setting and a high RPM setting. In this way, the rotational speed of threaded shaft 302 may be varied to cause mixing blade 322 to mix the contents of container 102 in either a slow manner or a more vigorous manner.

Figure 4:
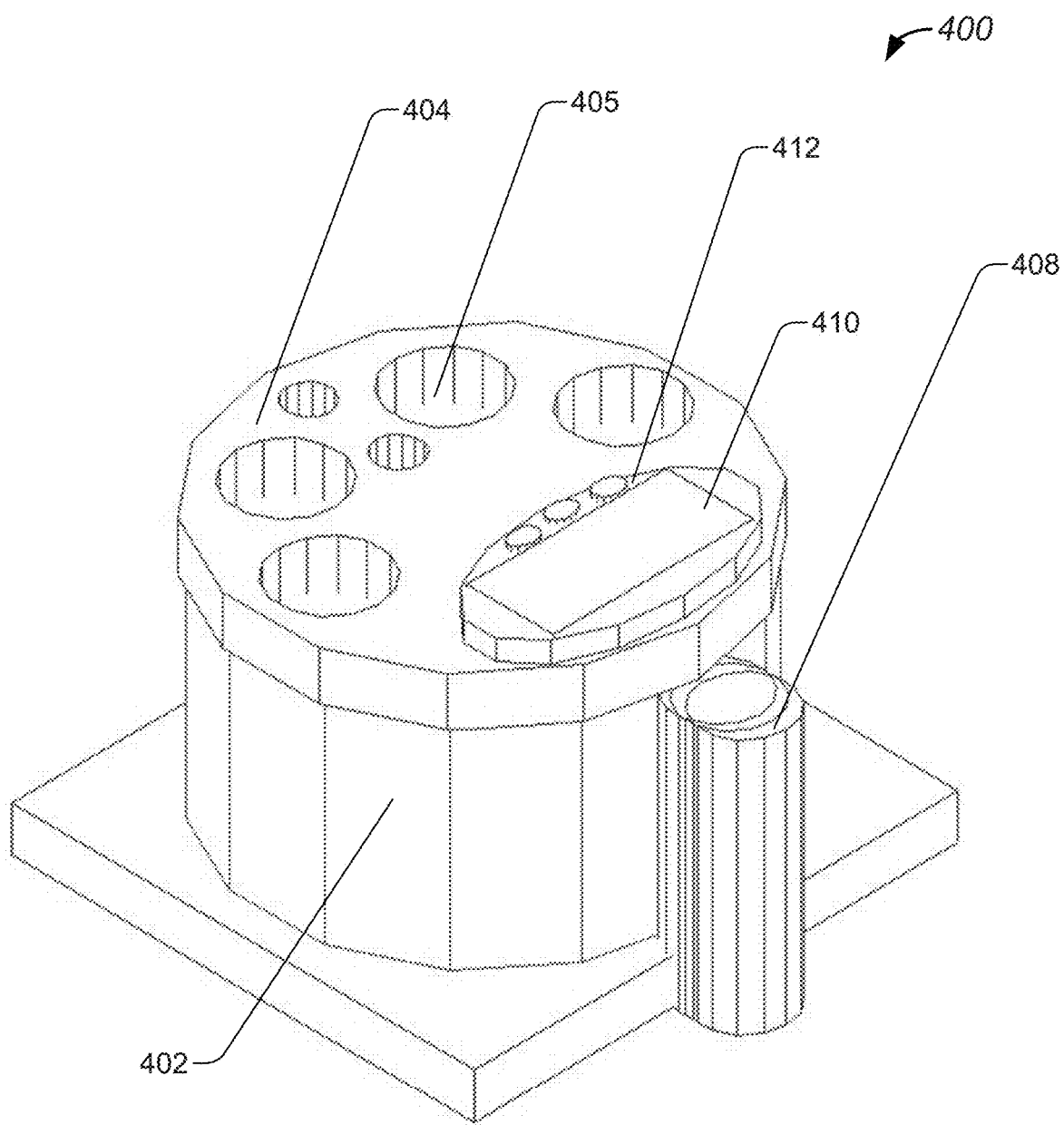
FIG. 4 illustrates a top view of another example of a programmable food preparation device that includes an interactive display, implemented in accordance with some embodiments.
Figure 15:
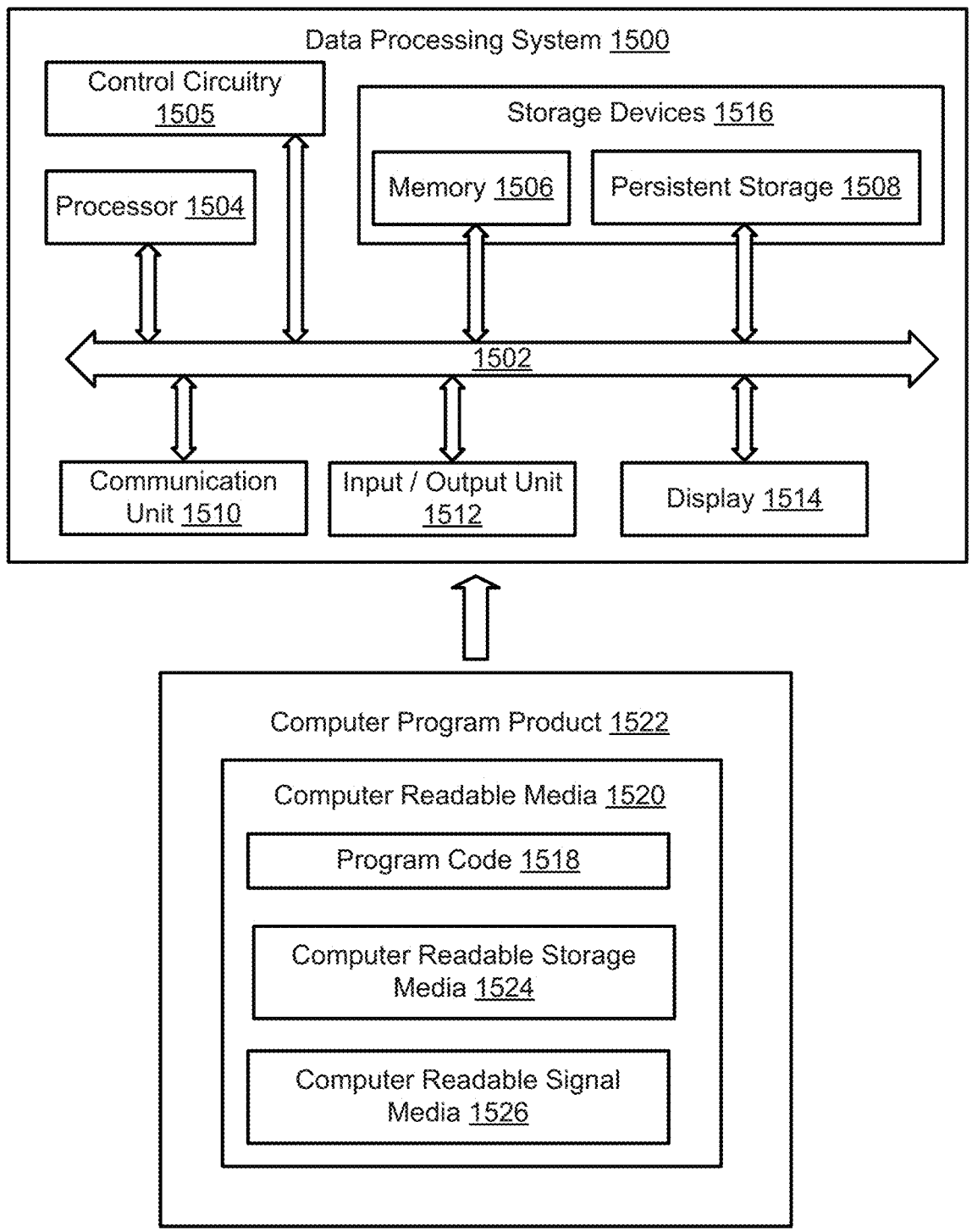
FIG. 15 illustrates a data processing system, configured in accordance with some embodiments.

FIG. 4 illustrates a top view of another example of a programmable food preparation device that includes an interactive display, implemented in accordance with some embodiments, such as device 100 (shown in FIG. 1), device 200 (shown in FIG. 2), as well as device 500 and device 600 (shown in FIGS. 5A, 5B, 6A, and 6B) discussed in greater detail below. As discussed above with reference to FIG. 1, food preparation device 400 may include container 402, plate 404, hole 405, and motor 408. Furthermore, food preparation device 400 may include display device 410 and various input buttons, such as button 412. As discussed above with reference to device 100, a flight version of a programmable food preparation device may be operated by a laptop computer, a hand-held computing device, or a data processing system, such as system 1500 (as shown in FIG. 15). According to some embodiments, a display and buttons may be implemented on the programmable food preparation device itself to facilitate control of the food preparation process. In some embodiments, the display may include a temperature display, and buttons and/or thumb dial to control one or more parameters, such as a temperature. Accordingly, a display device, such as display device 410, may be communicatively coupled to the laptop or hand held computing device.

In some embodiments, display device 410 may be an interactive display, such as a capacitive touch screen configured to receive one or more tactile inputs from a user. In various embodiments, display device 410 may be a liquid crystal display. Display device 410 may be configured to display various information associated with the preparation of food within food preparation device 400. As stated above, display device 410 may be coupled to a computer system via a communicative interface. Accordingly, display device 410 may be configured to receive data for display from the computer system, and may be further configured to provide data, such as a user input to the computer system.

For example, display device 410 may provide an interactive menu through which a user may select one or more recipes for a food to be prepared. In this example, the recipes and one or more data values representing an interactive menu may be stored on the computer system and may be provided to display device 410. Display device 410 may receive an input from a user which may be a selection of a particular recipe. The input may be provided to the computer system and food preparation may begin based on a control program associated with the selected recipe. Various instructions and status information associated with the recipe may also be displayed on display device 410. For example, if a user is required to perform a step, such as coupling a food receptacle to a plate, an appropriate instruction may be provided on display device 410. Moreover, display device 410 may also display status information associated with each step of the food preparation process, such as an identifier that identifies the current step, temperature information associated with the step, and temporal information, such as an amount of time remaining in that step and in the entire preparation process.

Figure 5A:
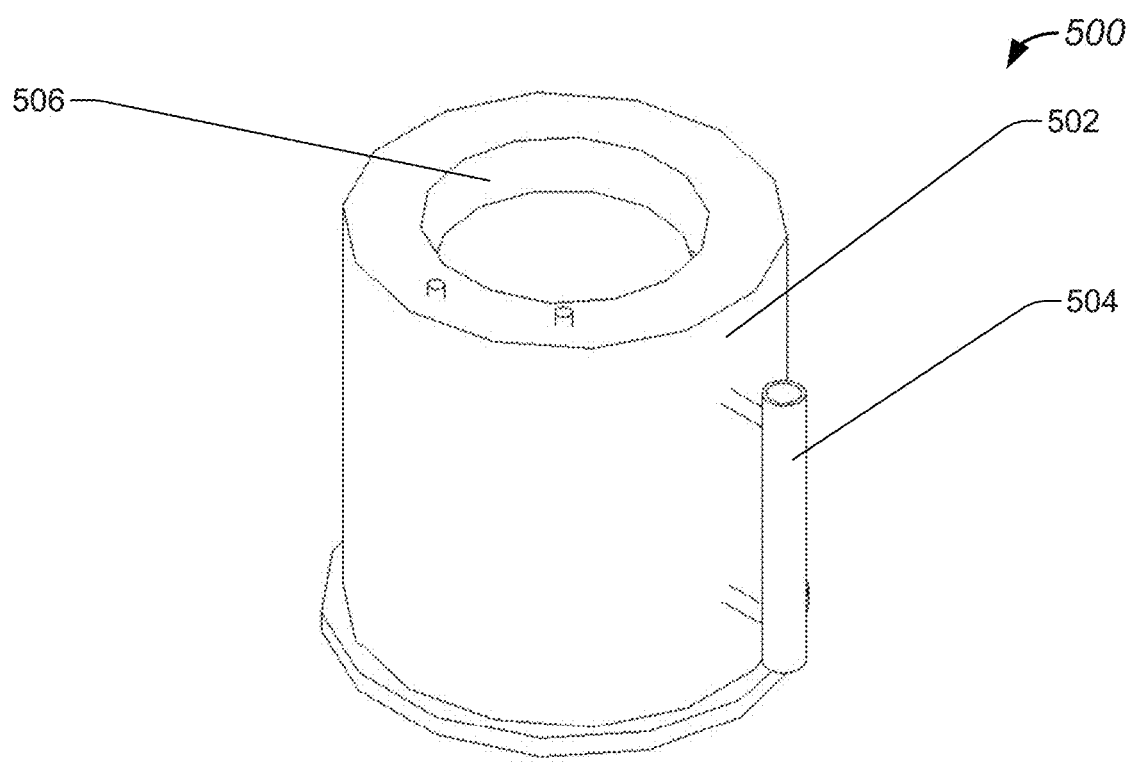
FIG. 5A illustrates another example of a programmable food preparation device configured to automatically prepare food, implemented in accordance with some embodiments.

FIG. 5A illustrates another example of a programmable food preparation device configured to automatically prepare food, implemented in accordance with some embodiments. As previously discussed, a programmable food preparation device, such as programmable food preparation device 500, may be configured to mix, thermally regulate, and otherwise prepare food in a single container. Accordingly, programmable food preparation device 500 may include various components which may be housed in or coupled to a container, such as external container 502. In various embodiments, programmable food preparation device 500 and its associated components may be configured to increase portability of the entire programmable food preparation device. For example, programmable food preparation device 500 may be configured as a hand-held device which may be carried by a user, thus providing a portable device that may be configured to prepare and serve food. As stated above, various components included in programmable food preparation device 500 may be configured to achieve such portability. For example, programmable food preparation device 500 may be configured to include a portable and rechargeable power source, which may be a battery, and a communications interface that is wireless thus enabling the electronics included programmable food preparation device 500 to communicate wirelessly with a controller implemented in a computer system. The programmable food preparation device 500 may have an electrical plug configured to receive a power input, recharge the internal battery, and provide a source of electrical energy to power an external device.

Accordingly, external container 502 may be configured as a hand-held mug or cup, and other components included in programmable food preparation device 500 may be configured to fit within external container 502. For example, external container 502 may include or be coupled to handle 504. In some embodiments, handle 504 may be removably coupled to external container 502, and may include thermal insulation configured to limit a maximum temperature of an external surface of handle 504. In some embodiments, external container 502 may also include thermal insulation configured to limit an external temperature of external container 502 and programmable food preparation device 500.

In some embodiments, external container 502 further includes opening 506 which may be configured to be coupled to one or more internal components of programmable food preparation device 500, as discussed in greater detail below with reference to FIG. 5B. Furthermore, opening 506 may provide an opening through which prepared food may be consumed upon completion of a food preparation process. Thus, the container of programmable food preparation device 500 may be configured to prepare food, and may be further configured to provide a serving vessel for the food once preparation has completed.

Figure 5B:
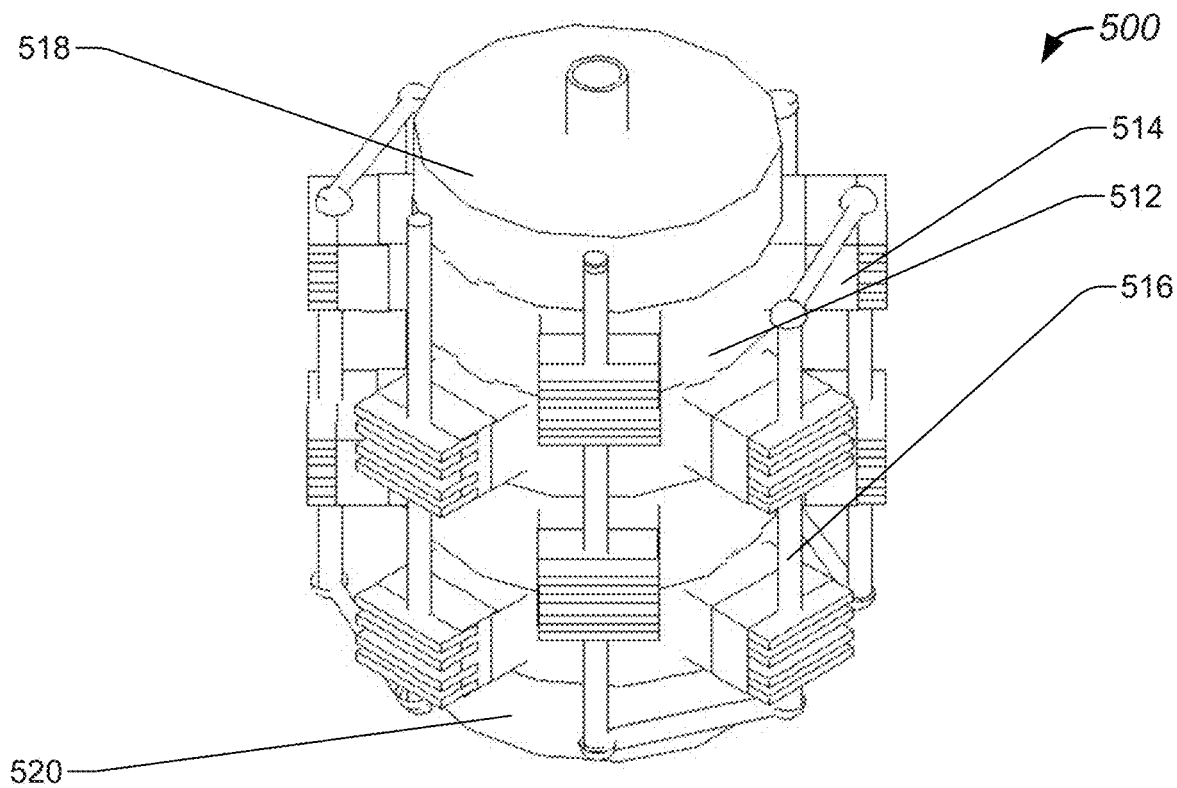
FIG. 5B illustrates an example of one or more components that may be included in a programmable food preparation device configured to automatically prepare food, implemented in accordance with some embodiments.

FIG. 5B illustrates an example of one or more components that may be included in a programmable food preparation device configured to automatically prepare food, implemented in accordance with some embodiments. As similarly discussed above, programmable food preparation device 500 may include various components configured to automatically or semi-automatically prepare food. For example, programmable food preparation device 500 may include internal container 512 which may be configured to receive and store one or more food ingredients. Moreover, programmable food preparation device 500 may include a thermal regulation system that includes thermoelectric devices, such as thermoelectric device 514, and support members, such as support member 516, which may also be configured as cooling devices. Programmable food preparation device 500 may further include top plate 518 and bottom plate 520. In various embodiments, internal container 512, the thermoelectric devices, the support members, top plate 518, and bottom plate 520 may all be configured to be housed within external container 502 discussed above with reference to FIG. 5A. Accordingly, the entirety of programmable food preparation device 500 may be configured to be portable and included in a hand-held container.

In some embodiments, support member 516 may also be configured to route a second food/beverage therethrough while a first food/beverage is being prepared within internal container 512. For example, a plurality of hot food ingredients may be prepared within internal container 512 while a cold beverage may be prepared within tubing of support member 516. In this way, both heating and cooling properties of thermoelectric devices included within programmable food preparation device 500 may be utilized simultaneously to heat and cool food ingredients/beverages. After food preparation is completed, the thermoelectric devices will generate electricity, and the thermoelectric devices in conjunction with the stored thermal energy may be utilized as a source of electrical energy. This captured electrical energy may be used to charge the device's internal battery, or this electrical energy may be siphoned off to an external device via an electrical plug.

Furthermore, according to some embodiments, top plate 518 and/or bottom plate 520 may be configured to facilitate the delivery of the prepared food product. In some embodiments, top plate 518 may be removably coupled to internal container 512, and may be removed through opening 506. In this example, upon completion of food preparation, top plate 518 may be removed, as well as a mixing device which may be included within internal container 512, and the prepared food product may be served and consumed directly from internal container 512. In various embodiments, bottom plate 520 may be configured to include one or more holes or ports that are configured to facilitate evacuation of the contents of internal container 512 to another external vessel.

Figure 6A:
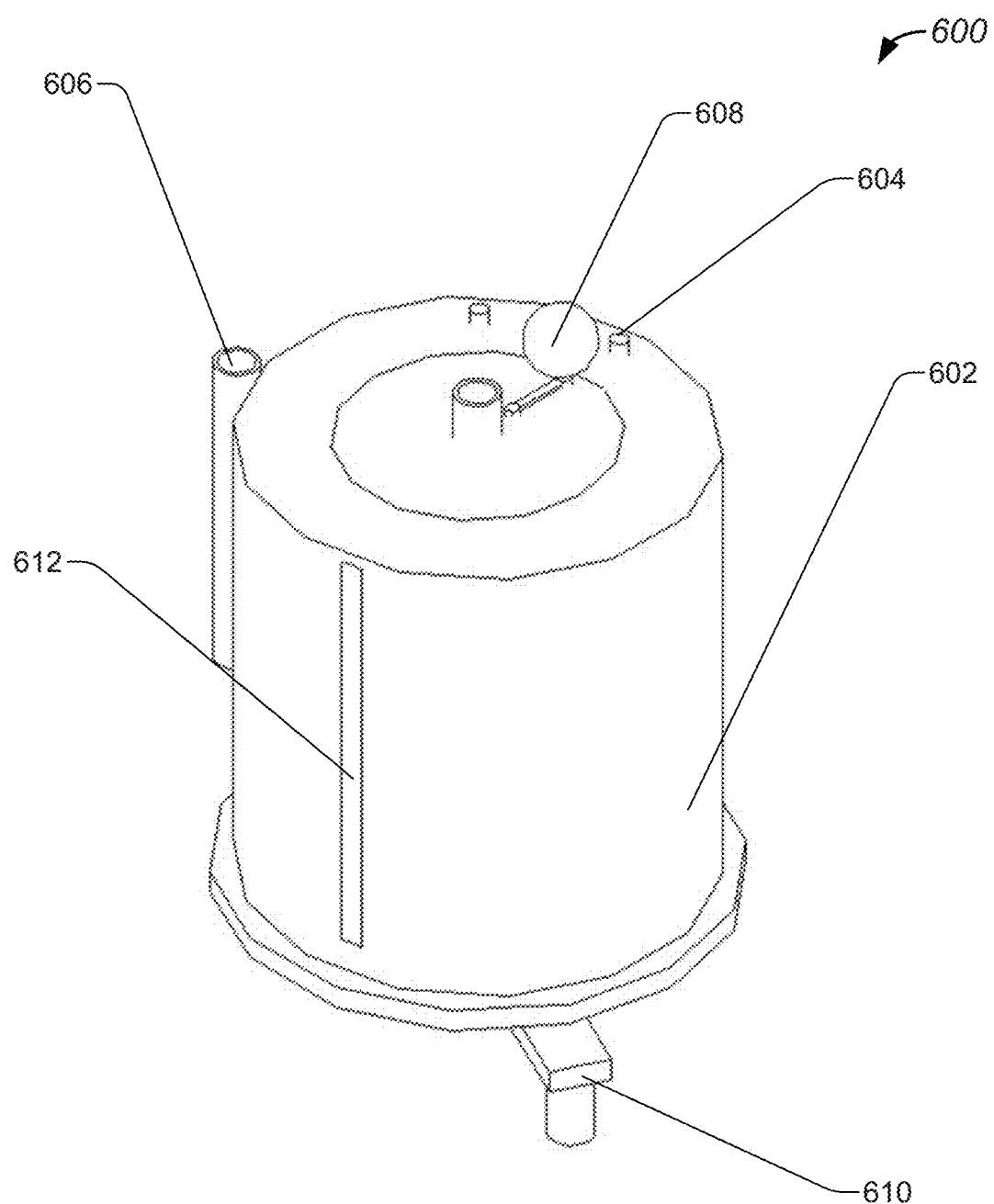
FIG. 6A illustrates an example of a programmable food preparation device configured to prepare food, implemented in accordance with some embodiments.

FIG. 6A illustrates an example of a programmable food preparation device configured to prepare food, implemented in accordance with some embodiments. As discussed above with reference to FIG. 5A and FIG. 5B, a programmable food preparation device, such as programmable food preparation device 600 may be configured to maximize portability and may be configured as a hand-held mug. As similarly discussed above, programmable food preparation device 600 may include container 602 and handle 606. Container 602 may also include port 604 which may be configured to receive one or more food ingredients and provide the one or more food ingredients to an internal volume of container 602 for food preparation.

In various embodiments, programmable food preparation device 600 may include one or more components configured to be operated manually, thus providing a semi-automatic food preparation process. For example, programmable food preparation device 600 may include mixing device 608 which may be configured to mix an internal volume of programmable food preparation device 600. In some embodiments, mixing device 608 may include a handle or knob which a user may use to move or rotate one or more components of mixing device 608, such as a mixing blade, within the internal volume of programmable food preparation device 600.

Moreover, programmable food preparation device 600 may further include crank 610 which may be coupled to a plunging device included within the internal volume of programmable food preparation device 600. Thus, crank 610 may be configured to move or adjust a position of the plunging device, which may be a plunger, in response to being rotated by the user. In some embodiments, as similarly discussed above, programmable food preparation device 600 may include a threaded central screw to which the plunging device and crank are coupled. In this way, the turning of crank 610 may modify the position of the plunging device, which may occur in response to the completion of the preparation of the food, and the contents of programmable food preparation device 600 may be evacuated.

Furthermore, according to some embodiments, programmable food preparation device 600 includes window 612 which is configured to enable visual observation of one or more internal components of programmable food preparation device 600. For example, an internal container of programmable food preparation device 600 may be made of a transparent material, such as PLEXIGLAS® ("Plexiglass" is a registered trademark of Arkema France Corp. of Colombes, France). In this example, window 612 may be configured to enable a user to see a location of internal components of programmable food preparation device 600, such as a mixing device and a plunging device.

Figure 6B:
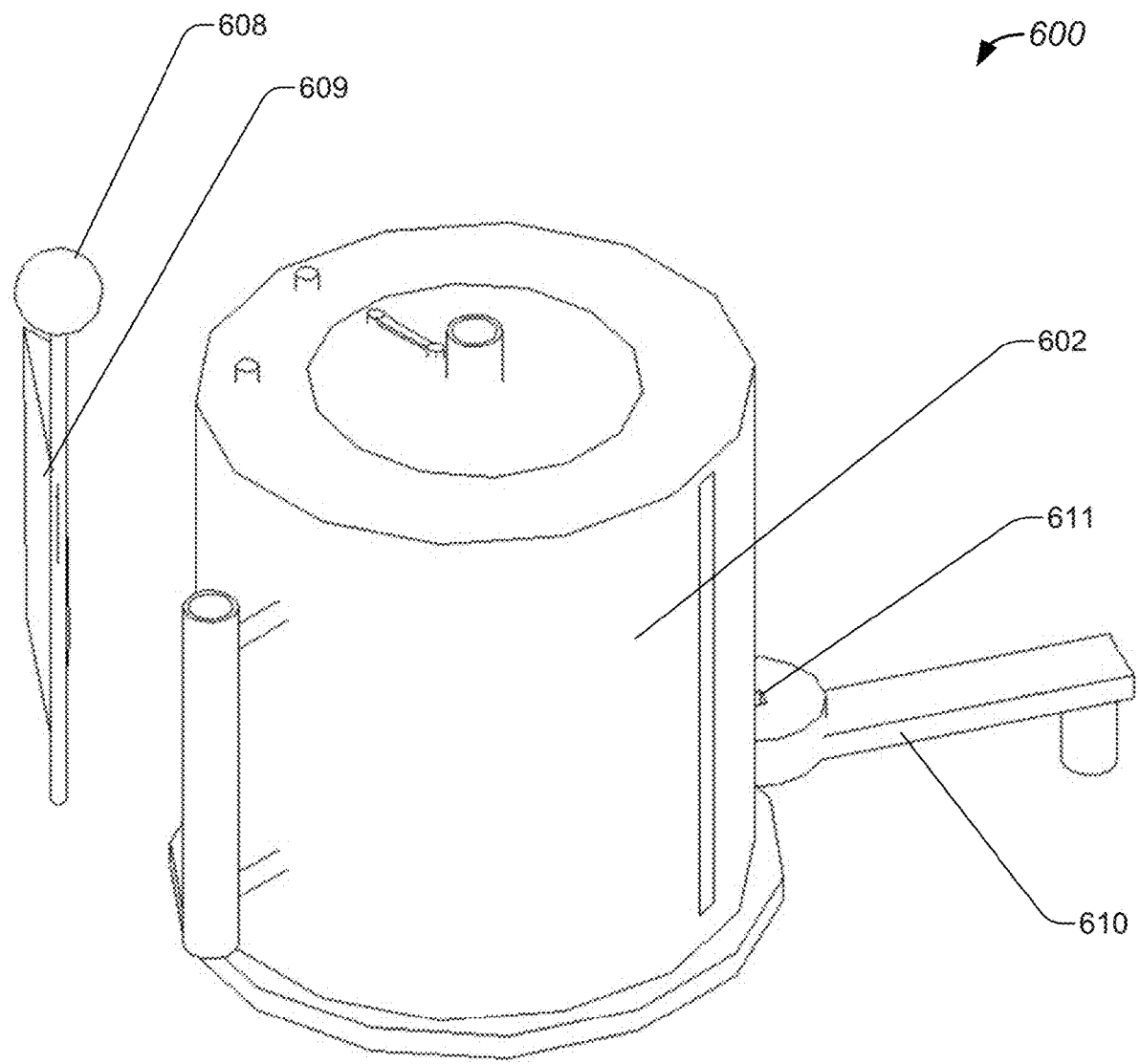
FIG. 6B illustrates an example of one or more components that may be included in a programmable food preparation device configured to prepare food, implemented in accordance with some embodiments.

FIG. 6B illustrates an example of one or more components that may be included in a programmable food preparation device configured to prepare food, implemented in accordance with some embodiments. As discussed above with reference to FIG. 6A, programmable food preparation device 600 may include one or more components configured to be operated manually, thus providing a semi-automatic food preparation process. Accordingly, FIG. 6B provides an additional view of programmable food preparation device 600 in which mixing device 608 and crank 610 have been decoupled and removed from container 602. As shown in FIG. 6B, mixing device 608 may include one or more components configured to mix an internal volume of programmable food preparation device 600, such as mixing blade 609. When included in container 602, mixing device 608 may be configured to receive a force at a knob or handle, and rotate mixing blade 609 within the internal volume of container 602 in response to receiving the force. Moreover, crank 610 may include socket 611 which may be configured to be removably coupled with a central screw of food preparation device 600. In this way, crank 610 may receive a rotational force from a user, and socket 611 may be configured to transfer the rotational force to the central screw and move a plunging device included within programmable food preparation device 600 to evacuate its contents.

Figure 7:
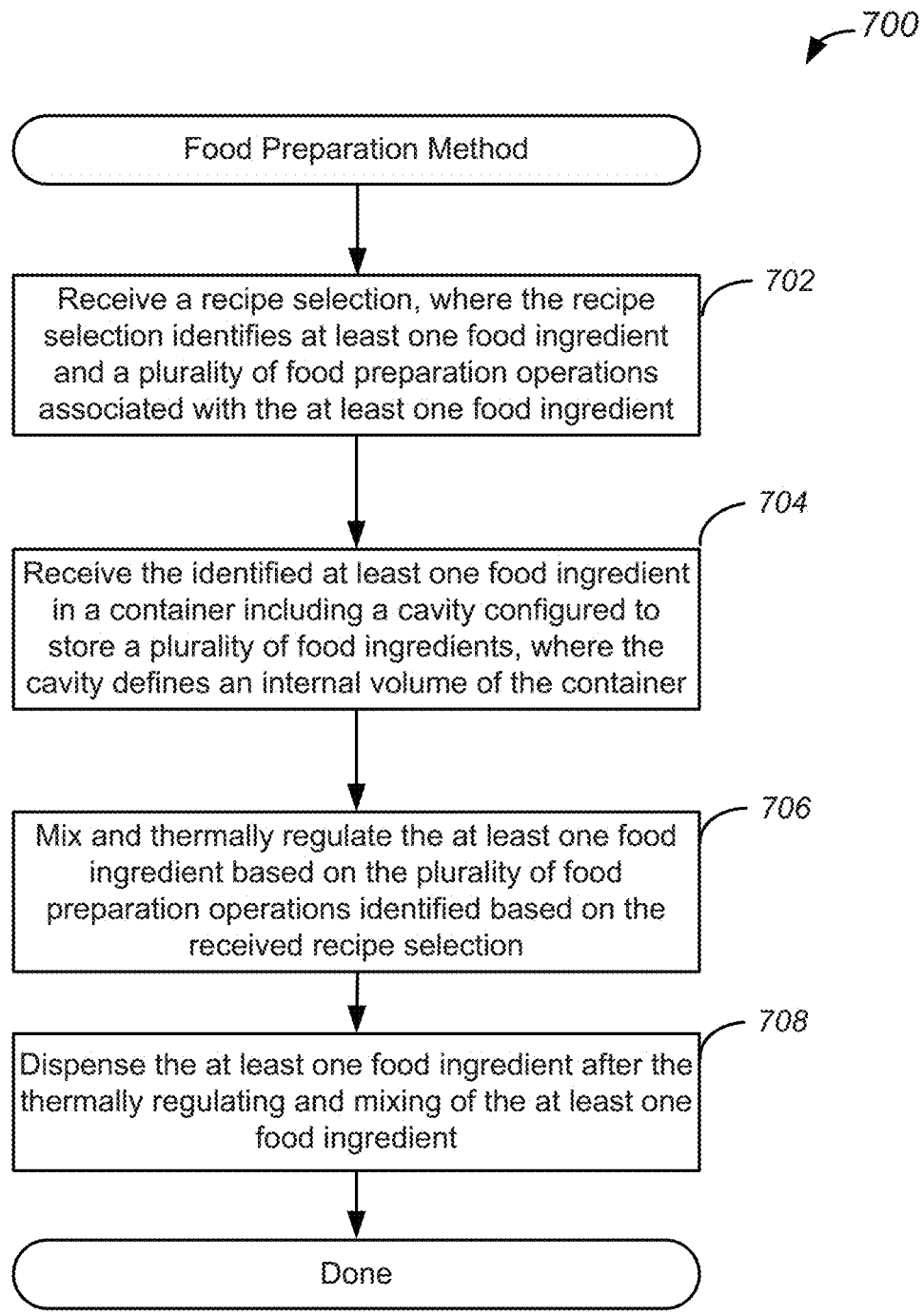
FIG. 7 illustrates a flow chart of a method for preparing food using a programmable food preparation device, implemented in accordance with some embodiments.

FIG. 7 illustrates a flow chart of a method for preparing food using a programmable food preparation device, implemented in accordance with some embodiments, such as device 100 (shown in FIG. 1), device 200 (shown in FIG. 2), device 400 (shown in FIG. 4), as well as device 500 and device 600 (shown in FIGS. 5A, 5B, 6A, and 6B). As previously discussed, a programmable food preparation device may receive a selection for an item of food or a foodstuff, and automatically prepare the food for consumption. In this way, a single food preparation device may obtain predetermined amounts of food ingredients, simultaneously mix and thermally regulate the food ingredients in a single container, and dispense the food ingredients for consumption. Moreover, the food preparation device may be integrated with aircraft or spacecraft to provide a programmable and substantially automated food preparation system for the flight crew. In some embodiments, a computer control program may aid the user in the process of preparing the food, either automatically, or semi-automatically. As discussed above with reference to FIG. 4, device 400 may facilitate substantial automation of a food preparation process, such as method 700, via the use of a display device and associated buttons and/or thumbwheels. In one example implemented on aircraft, various menu selections may be made from a first-class cabin touch screen device accessible by a traveler. The selection may be transmitted to a computer that controls the food preparation process. The display screen discussed above with reference to device 400 may provide alerts of progress, and requests for ingredients to be placed in containers/hoppers for delivery during the cooking process.

Accordingly, during operation 702, a recipe selection may be received. In some embodiments, the recipe selection may be made by a user as part of a request for food. For example, the user, who may be an astronaut, airplane flight attendant, or other flight staff member, may navigate a menu and select an item of food that he or she desires for a meal. In response to receiving the selection, a recipe that identifies ingredients and preparation operations may be retrieved from a memory device that may be included in a food preparation device or in an associated computer system.

During operation 704, at least one food ingredient may be identified and introduced into a container of the food preparation device. In some embodiments, prepackaged receptacles that include the food ingredients may already be coupled to the food preparation device as part of a food storage device or system. Accordingly, the food ingredients may be identified based on the selected recipe, and introduced into the food preparation device automatically and without user intervention. In some embodiments, if no food storage system is available, the user may manually introduce the food ingredients into the container. In some embodiments, one or more components of the programmable food preparation device may provide audible alerts, automated speech, or visual prompts on a display device to provide alerts and/or instructions to a user to instruct the user which ingredients to use, and when to add them.

During operation 706, the at least one food ingredient may be mixed and thermally regulated based on the plurality of food preparation operations identified by the received recipe selection. Thus, the food ingredients may be simultaneously mixed and thermal energy may be exchanged according to an automated series of food preparation operations. Once the food ingredients have been mixed and thermal energy has been exchanged in accordance with the selected recipe, during operation 708, the food ingredients may be dispensed for consumption by the user.

Figure 8:
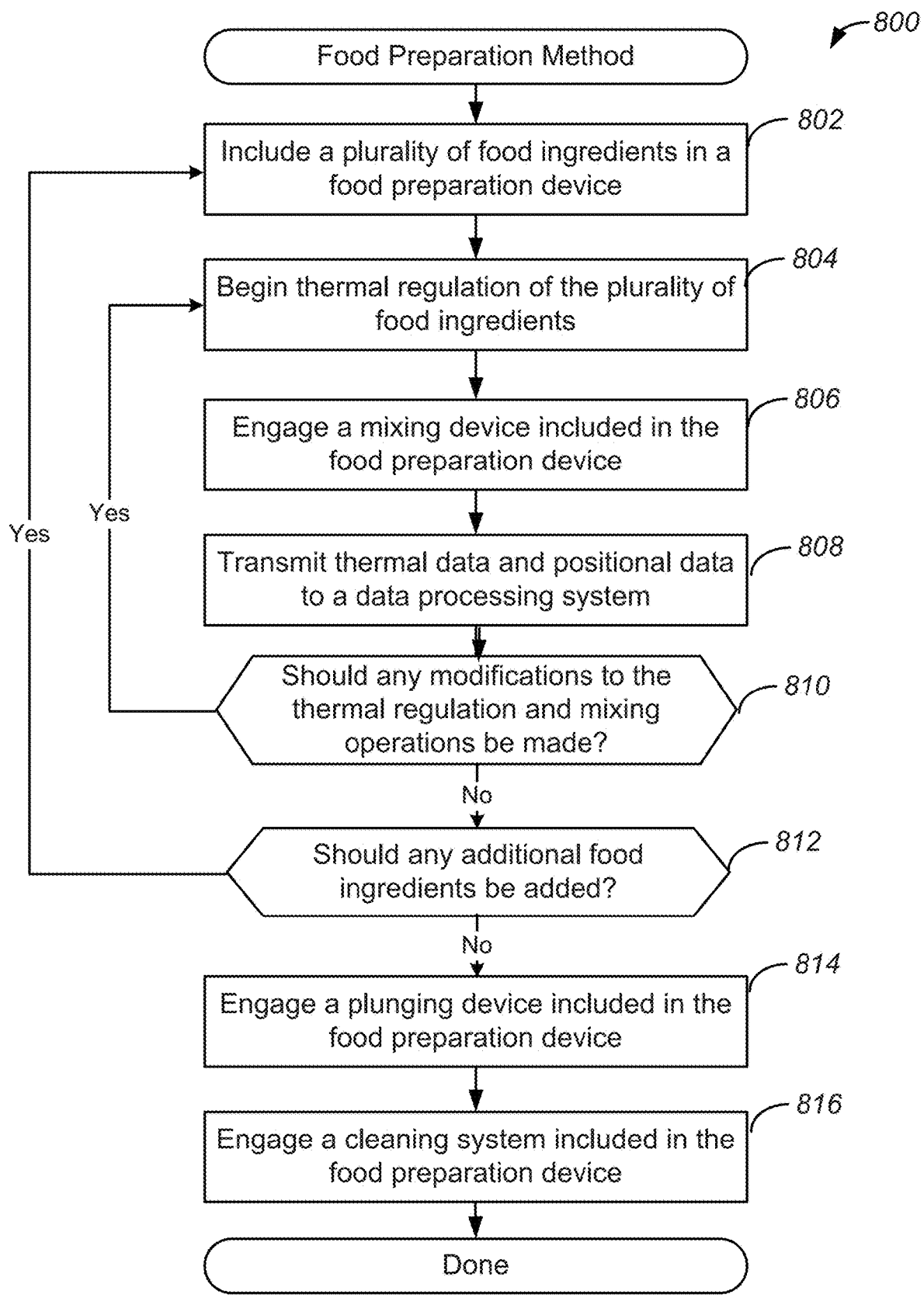
FIG. 8 illustrates a flow chart of another method for preparing food using a programmable food preparation device, implemented in accordance with some embodiments.

FIG. 8 illustrates a flow chart of another method for preparing food using a programmable food preparation device, implemented in accordance with some embodiments, such as device 100 (shown in FIG. 1), device 200 (shown in FIG. 2), device 400 (shown in FIG. 4), as well as device 500 and device 600 (shown in FIGS. 5A, 5B, 6A, and 6B). In various embodiments, method 800 illustrates additional features of thermal and mixing regulation that may be implemented with a method for preparing food, such as method 700 (shown in FIG. 7). As previously discussed, the programmable food preparation device may receive a selection for an item of food or a foodstuff, and automatically prepare the food for consumption. Accordingly, a single food preparation device may obtain predetermined amounts of food ingredients, simultaneously mix and thermally regulate the food ingredients in a single container, and dispense the food ingredients for consumption. Moreover, the food preparation device may be communicatively coupled with a computer system that may be configured to execute a computer control program that may automate substantially all of the food preparation operations. In this way, the preparation of the food may be preprogrammed and automatic, thus requiring minimal intervention from the user.

Accordingly, during operation 802, a plurality of ingredients may be included in a container of a food preparation device. As previously discussed, the ingredients may be identified based on a recipe selection made by a user, such as a crew member of an airplane, spacecraft, or space station. In some embodiments, the identity of each ingredient and a quantity of each ingredient may be identified based on a preprogrammed recipe that may be associated with a food item that has been selected, and may be stored within a data table of a memory device associated with a computer system. In some embodiments, the data table may include one or more data values identifying ingredients and preparation operations associated with each food item. For example, data stored for a particular recipe may identify instructions or commands for one or more components of the food preparation device, set point temperatures, time durations of operations, a list of errors, and a list of constraints for error or abort conditions. In this way, the data table may provide an organized representation of recipes in which an entire list of ingredients and associated operations may be identified and retrieved based on a received selection of a food item.

According to various embodiments, the ingredients may be included in the container automatically. As similarly discussed above, a food storage device or system may be coupled to the food preparation device. For example, the food storage system may include several containers or receptacles that each include individual food ingredients. One or more of the containers may be coupled to one or more holes of a plate of the container of the food preparation device. A computer control program associated with the selected recipe may have been previously programmed to identify specific ingredients that are included in the recipe, as well as a precise quantity of each ingredient included in the recipe. In some embodiments, each of the containers or receptacles coupled to the food preparation device may be coupled to an automatic food delivery device or system that may be included in or part of the food storage system, and may be configured to inject the contents of each receptacle into the container in response to receiving an input or command from the computer system. For example, the automatic food delivery system may include several syringes coupled to actuators. Thus, an amount of each ingredient identified by the computer control program may be automatically transferred from the receptacles into the container of the food preparation device.

In some embodiments, the ingredients may be included in the container manually. For example, in response to receiving a selection from the user and retrieving a recipe associated with the selection, a computer system may provide one or more instructions to be displayed on a display device of the food preparation device. For example, the display device may instruct the user to couple food containers including specific ingredients to particular holes of the plate of the food preparation device and may also instruct the user to insert a specific amount of each ingredient into the container of the food preparation device. In some embodiments, the user may provide an input to a button of the food preparation device, such as the buttons described above with reference to device 400 (shown in FIG. 4), once the instructions have been completed. The input may be a "READY" signal indicating that the user has completed including the ingredients in the container of the food preparation device.

During operation 804, the food preparation device may begin thermal regulation of the container. In various embodiments, thermal regulation of the container may be achieved by applying one or more currents to one or more thermoelectric devices of the food preparation device. As previously discussed, the thermoelectric devices may be capable of exchanging thermal energy with the container of the food preparation device based on a current that is passed through each thermoelectric device. In some embodiments, the application of the current is controlled by the computer control program executed by the computer system. The computer control program may control the operation of various components of food preparation device based on parameters identified by a recipe, which may include one or more data values such as a list of instructions, a list of set point temperatures, a list of time durations, a list of errors, and a list of constraints for error or abort conditions. Thus, the computer control program for a selected recipe may indicate that the food ingredients should be heated to a particular set point temperature, such as 150 degrees Fahrenheit. A current or voltage source may continue applying a voltage or current to the thermoelectric devices until the target set point temperature is reached. Moreover, the computer system and computer control program may be table driven or operate as a state machine, and step through various set point temperatures during the process of preparing the food. In this way, multiple heating and/or cooling operations may be performed automatically during the preparation of a single recipe.

It will be appreciated that while operation 804 may be performed after operation 802, in some embodiments, operation 804 may be performed during or prior to operation 802. For example, the container of the food preparation device may be heated during the introduction of the ingredients or prior to the introduction of the ingredients into the container.

During operation 806, the food preparation device may engage a mixing device within the container. As similarly discussed above, a mixing device may be included and positioned within the container of the food preparation device and may be controlled by the computer system and a computer control program associated with the computer system. For example, the computer system may provide one or more commands to the motor associated with the mixing device and a positioning actuator, if included. In this example, the motor may be engaged, and a threaded shaft included in the mixing device may thread and engage a mixing blade thus causing the mixing blade to be rotated to mix the contents of the container of the food preparation device. The speed of the rotation and mixing may be determined based on one or more parameters identified by the computer control program. The mixing blade may continue rotating and mixing until a target or set position is reached along the threaded shaft. For example, once the mixing blade approaches the end of the threaded shaft, as determined based on one or more telemetry devices, the rotation of the shaft and blade may be slowed, stopped, and reversed. The mixing may continue for a duration of time determined based on the computer control program. In this way, one or more mixing operations may be performed automatically during the preparation of the recipe.

During operation 808, thermal data and positional data may be transmitted to a computer system. As similarly discussed above, the food preparation device may include various sensors and telemetry devices configured to monitor and report data describing a temperature of the contents of the container and the position of one or more components included within the container. The data may be taken periodically or dynamically and in response to a request from the computer system. In this way, operation 808 may be performed numerous times during operation 804 and operation 806 to provide the computer system with feedback that enables the computer system to step through the execution of the computer control program.

During operation 810, it may be determined whether or not any modifications should be made to the thermal regulation and/or mixing of the food ingredients. For example, the temperature of the container may have deviated from a set point temperature by greater than a predetermined threshold, such as 3 degrees Fahrenheit. In this example, the contents of the container may have been heated to the target temperature, but may have cooled due to exposure of the food preparation device to the ambient environment. Thus, additional heating may be required to return the contents of the container to their target temperature. If it is determined that modifications should be made, food preparation method 800 may return to operation 804. If it is determined that modifications should not be made, food preparation method 800 may proceed to operation 812.

During operation 812, it may be determined whether or not any additional food ingredients should be added to the food preparation device. In some embodiments, a recipe may involve adding different ingredients at different times during the food preparation process. Thus, a first ingredient may be added initially, while a second ingredient may be added later. If it is determined that additional food ingredients should be added to the food preparation device, food preparation method 800 may return to operation 802. If it is determined that additional food ingredients should not be added to the food preparation device, food preparation method 800 may proceed to operation 814.

During operation 814, the food preparation device may engage a plunging device and empty the contents of the container. Thus, in some embodiments, the computer system may determine that the food is prepared and should be dispensed. One or more dispensing operations may be automatically executed in response to reaching the end of the computer control program for a particular recipe. For example, the computer system may be configured to provide one or more commands to the mixing device and the motor associated with the mixing device that cause the mixing device to park the mixing blade. In some embodiments, the temperature of the food may be automatically cooled to a preset serving temperature that may be user defined. Thus, astronauts serving on a space station may identify a specific temperature at which the food should be served. The food preparation device may be configured to automatically cool the food to the specified temperature prior to serving. Once the serving temperature has been reached, a plunger disc included in the mixing device may be moved to press and force the contents of the container into another container which may be an external vessel.

During operation 816, the food preparation device may engage a cleaning system to clean an interior of the container. The cleaning system may inject soap and water into the container of the food preparation device. The mixing blade and plunger disc of the mixing device may be moved back and forth to ensure that all interior surfaces are cleaned by the soap and water. Upon termination of a cleaning sequence, the soap and water may be evacuated from the container via an exhaust hose or valve.

Figure 9A:
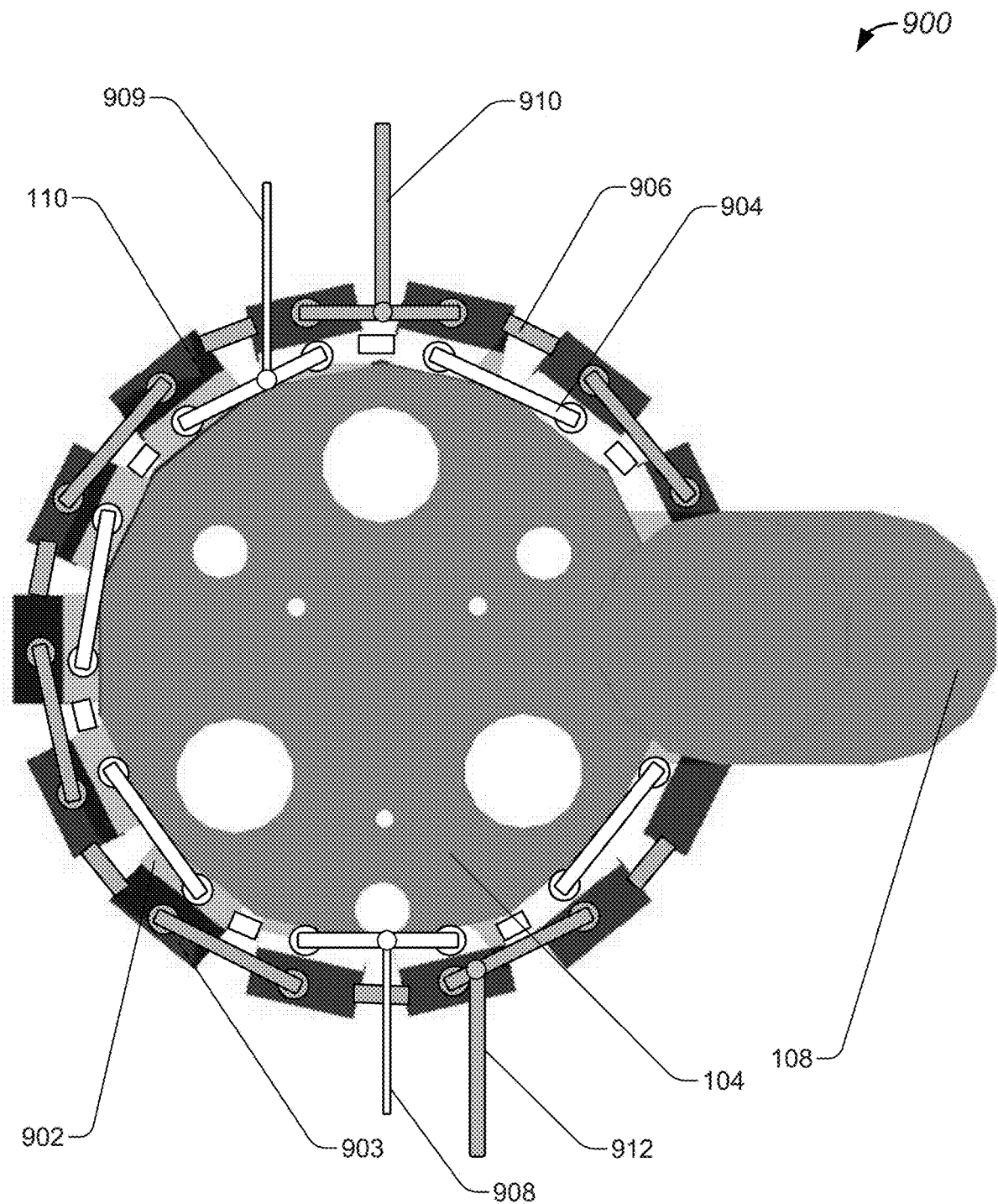
FIG. 9A illustrates another example of a programmable food preparation device, configured in accordance with some embodiments.

FIG. 9A illustrates another example of a programmable food preparation device, configured in accordance with some embodiments. As similarly discussed above, a food preparation device, such as device 900, includes various components similar to those included in device 100 discussed above with reference to FIGS. 1, 2, 3A-3C, 4, 5A, 5B, 6A, and 6B. In some embodiments, device 900 may include components that are configured to automatically deliver predetermined amounts of food ingredients into a container, such as container 102, where food ingredients may be mixed and thermal energy may be exchanged with the food ingredients. As will be discussed in greater detail below, device 900 may include any or all of components of device 100 with additional features described in detail below. As previously stated, the container may be bounded and enclosed by plates, such as plate 104, and mechanical energy may be transferred to the contents of the container to impart a mixing motion by motor 108 which may be coupled to a mixing device, such as mixing device 300. Moreover, as discussed above and below with reference to FIGS. 4 and 15 respectively, control circuitry is configured to control various components of device 900 to implement the various programmable food preparation operations disclosed herein.

In some embodiments, device 900 includes various thermoelectric devices, such as thermoelectric device 110. Thus, according to some embodiments, the thermoelectric devices may be configured to change temperature in response to the application of an electrical current to the thermoelectric devices. In one example, a thermoelectric device causes a first change in temperature in response to a first current passing through the thermoelectric device in a first direction, and causes a second change in temperature in response to a second current passing through the thermoelectric device in a second direction. Thus, thermoelectric devices included in device 900 may be configured to increase a temperature and transfer heat to container 102 in response to the application of a first current. Moreover, the thermoelectric devices may be further configured to decrease a temperature and remove heat from container 102 in response to the application of a second current. In this way, thermoelectric devices exchange thermal energy with container 102, and heat or cool container 102 and the internal volume of container 102 based on the application of one or more currents. In some embodiments, an example of such a thermoelectric device is a Peltier device, or any other suitable device capable of generating a heating or cooling effect responsive to different currents and/or voltages. As previously discussed, thermoelectric devices may include additional types of heating or cooling devices, such as heat strips and heating plates, to further enhance the heating and cooling capabilities device 900.

Thermoelectric device 110 is coupled to various thermal transfer devices, such as thermal transfer device 903 and thermal transfer device 902. In some embodiments, thermal transfer device 903 is cooling device, such as cooling device 112 discussed above. Thus, each of thermal transfer device 903 and thermal transfer device 902 may be configured as a cooling device or a warming device depending on a direction of a current applied to the thermoelectric devices.

For example, if a first current applied to a thermoelectric device, such as thermoelectric device 110, the application of the first current causes a first side of thermoelectric device 110 facing inwards towards container 102 to increase in temperature, and thermal transfer device 902 operates as a warming device and transfers thermal energy to container 102 as heat. In this example, a second side of thermoelectric device 110 that is opposite the first side, and faces away from container 102 experiences a decrease in temperature. Accordingly, thermal transfer device 903 is configured as a cooling device. If a second current with a different direction than the first current, such as an opposite direction, is applied to the thermoelectric devices, then the opposite is true, and thermal transfer device 902 is configured as a cooling device that cools container 102 and transfers thermal energy away from container 102, while thermal transfer device 903 is configured as a warming device. Accordingly, when the first current is applied, device 900 may be configured as a cooker that heats the contents of device 900, and when a second current is applied, device 900 may be configured as a cooler that cools the contents of device 900.

In various embodiments, device 900 includes various thermal conduits that are configured to transfer thermal energy amongst thermoelectric devices as well as components of device 900. Moreover, as will be discussed in greater detail below, the thermal conduits are further configured to transfer thermal energy to and from other system components that are coupled to device 900, such as other vehicle components and systems of an aircraft, spacecraft, or space station. As will be discussed in greater detail below, such components may include environmental systems, payload areas, cryogenic systems, air exchangers, avionics fans, and air handlers.

In various embodiments, device 900 includes first thermal conduit 904 which is thermally conductive, and is configured to couple all thermal transfer devices that are coupled on a first side of the thermoelectric devices. In one example, first thermal conduit 904 is a hollow tube that circulates a fluid, such as water. As shown in FIG. 9A, the first side of the thermoelectric devices refers to the side that faces inwards, and towards the container of device 900 which is bounded by plate 104. Accordingly, first thermal conduit 904 couples all thermal devices, such as device 902, that are coupled between the thermoelectric devices and the container. In various embodiments, such coupling is implemented by using first thermal conduit 904 to physically connect all of the thermoelectric devices associated with first thermal conduit 904. For example, a hole is drilled through each thermal transfer device associated with first thermal conduit 904, such as those on the first side of the thermoelectric devices, a tube extends through each of the holes, and the thermal transfer devices are thermally coupled to the tube once the tube is in place via any suitable technique, such as bonding or soldering. In this way, all of the thermoelectric devices and thermal transfer devices associated with the first thermal conduit are thermally coupled to first thermal conduit 904.

When in operation, such as when fluid is pumped and circulated through first thermal conduit 904, thermal energy may be transferred amongst thermal transfer devices and ensure a uniform application or removal of thermal energy from container 102. Furthermore, the fluid circulating through first thermal conduit 904 may continue to travel through an interface, such as interface 908 to another component or system to heat or cool that component or system. In this way, instead of the ambient environment being heated or cooled, other components or systems may be heated or cooled when one or more cooking operations are being implemented.

According to some embodiments, device 900 further includes second thermal conduit 906. As similarly discussed above with reference to first thermal conduit 904, second thermal conduit 906 is thermally conductive, and is configured to couple all thermal devices that are coupled on a second side of the thermoelectric devices. As stated above, second thermal conduit 906 may be a conductive tube or hollow tube that circulates a fluid, such as water. As shown in FIG. 9A, the second side of the thermoelectric devices refers to the side that faces outwards and away from the container of device 900 which is bounded by plate 104. Accordingly, second thermal conduit 906 couples all thermal transfer devices, such as thermal transfer device 903, that are coupled on the other side of the container. As similarly discussed above, such coupling is implemented by using second thermal conduit 906 to physically connect all of the thermoelectric devices associated with the second thermal conduit 906. In one example, this is accomplished by drilling a hole through each thermal transfer device associated with second thermal conduit 906, such as those on the second side of the thermoelectric devices, inserting a tube through each of the holes, and coupling the thermal transfer devices to the tube once the tube is in place via any suitable technique, such as bonding or soldering. In this way, all of the thermoelectric devices and thermal transfer devices associated with the second thermal conduit are thermally coupled to second thermal conduit 906.

In various embodiments, device 900 also includes various interfaces that provide thermal interfaces to one or more other components or systems associated with device 900. For example, device 900 may be coupled to environmental controls or other systems of an aircraft, spacecraft, or space station. In such an example, device 900 is configured to transfer thermal energy to or from such a system via one or more interfaces. Accordingly, device 900 includes first interface 908, second interface 910, third interface 909, and fourth interface 912. In some embodiments, first interface 908 and third interface 909 are configured to transfer thermal energy associated with first thermal conduit 904. For example, first interface 908 may be configured as an output to a first thermal pathway, and third interface 909 may be configured as an input from the first thermal pathway, thus closing a thermal loop created by the first thermal pathway. Moreover, second interface 910 and fourth interface 912 are configured to transfer thermal energy associated with second thermal conduit 906. For example, fourth interface 912 may be configured as an output to a second thermal pathway, and second interface 910 may be configured as an input from the second thermal pathway, thus closing a thermal loop created by the second thermal pathway.

In one example, if device 900 is configured as a cooker, and first thermal conduit 904 and second thermal conduit 906 are configured to circulate a fluid, such as water, that water circulated through first thermal conduit 904 is heated as the water flows through various thermal transfer devices, such as thermal transfer device 902, during a cooking process. Once heated, the water may exit first thermal conduit 904 via first interface 908, and may be provided to another system component, such as environmental control, where the water may be used to heat an onboard environmental resource, such as an air supply or water supply, and may return via third interface 909. Moreover, fluid that is circulated through second thermal conduit 906 is cooled as the fluid flows through various thermal transfer devices, such as thermal transfer device 903. Once cooled, the fluid may exit second thermal conduit 906 via fourth interface 912, and may be provided to a system component, such as on-board cryogenics, where the fluid may be used to cool an item currently in cold storage, and may return via second interface 910.

Figure 12:
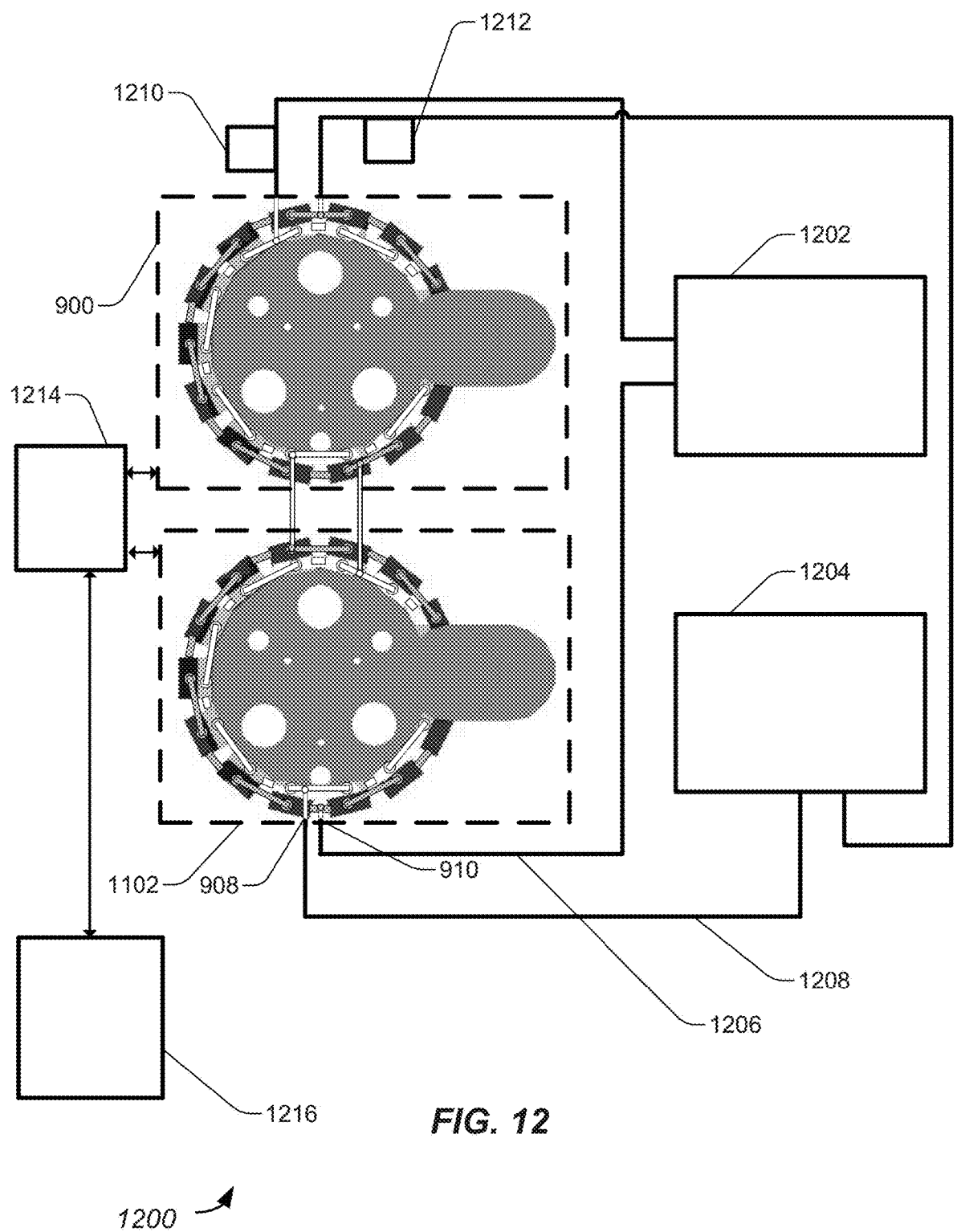
FIG. 12 illustrates another example of a food preparation system, configured in accordance with some embodiments.

In various embodiments, the operation of thermoelectric devices and components associated with thermal conduits 904 and 906, discussed in greater detail below with reference to FIG. 12, is controlled by various control circuitry that may be implemented as part of a data processing system, such as system 1500 described in greater detail below with reference to FIG. 15. Accordingly, the control circuitry may be configured to apply one or more currents to the thermoelectric devices in accordance with a control program associated with a recipe, as previously discussed. Furthermore, the coupling of thermal conduits with other vehicle components may also be controlled by the control circuitry.

For example, for a thermal conduits associated with heating operations, such as thermal conduit 904 or 906 depending on the configuration of device 900, the control circuitry is configured to determine if more or less heat is being produced than is required to cook the food ingredients. Such determinations may be made based on temperatures of thermal conduits, associated thermal transfer devices, and/or appropriate sides of the thermoelectric devices that may be measured by various thermal sensors previously discussed above. The control circuitry is configured to enable or increase coupling between thermal conduits and vehicle components based on such determinations. For example, if the control circuitry determines that the thermal conduits, associated thermal transfer devices, and/or appropriate side of the thermoelectric devices are hotter than required by a recipe, the control circuitry is configured to enable or increase coupling with a vehicle component. If the control circuitry determines that less heat is being produced than required, the control circuitry is configured to disable or decrease coupling with the vehicle component.

Similarly, for a thermal conduit associated with cooling operations, such as thermal conduit 904 or 906 depending on the configuration of device 900, the control circuitry is configured to determine if the thermal conduit, associated thermal transfer devices, and/or appropriate side of the thermoelectric devices are cooler than required by the recipe. If such a determination is made, the control circuitry is configured to enable or increase coupling between a thermal conduit and a vehicle component. If the control circuitry determines that the thermal conduit, thermal transfer devices, and/or appropriate side of the thermoelectric devices are not as cold as required, the control circuitry may disable or decrease coupling with the vehicle component. As will be discussed in greater detail below with reference to FIG. 12, such coupling may be enabled and disabled or increased and decreased via activation and deactivation of components, such as pumps, associated with the thermal conduits.

In some embodiments, the spacecraft control circuitry is configured to use the available thermal energy in the resident fluid temperature loops or pathways, which are discussed in greater detail below, to reduce electrical power usage of the heating and cooling devices. Reduced electrical power usage may be achieved by coupling the appropriate vehicle fluid temperature loop or pathway that is closest to the desired heating temperature to the heating devices heating loop or thermal conduit, and by coupling the appropriate vehicle fluid temperature loop or pathway that is closest to the desired cooling temperature to the cooling devices cooling loop or thermal conduit.

Figure 9B:
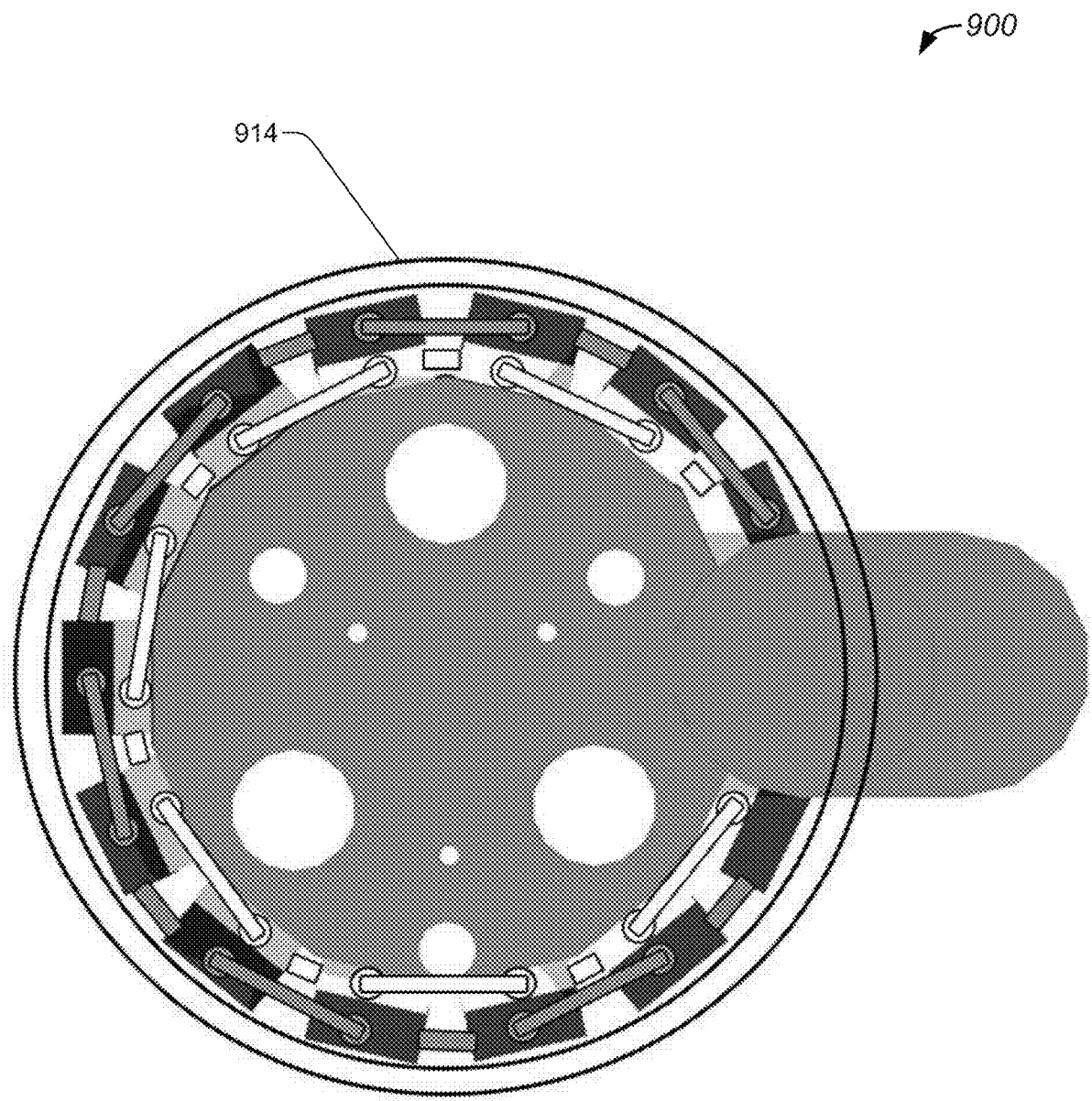
FIG. 9B illustrates an example of a programmable food preparation device having an insulated enclosure, configured in accordance with some embodiments.

FIG. 9B illustrates another example of a programmable food preparation device 900 having an insulated enclosure, configured in accordance with some embodiments. As similarly discussed above with reference to FIG. 9A, a programmable food preparation device 900 includes various components similar to those included in device 100 discussed above with reference to FIGS. 1, 2, 3A-3C, 4, 5A, 5B, 6A, and 6B, and device 900 discussed above with reference to FIG. 9A. In some embodiments, device 900 may include components such as a container 102, plates 104 and 106 that bound an internal volume defined by the container 102, a motor 108, thermoelectric devices such as thermoelectric device 110, thermal transfer devices such as thermal transfer devices 902 and 903, and thermal conduits such as thermal conduits 904 and 906. In various embodiments, a programmable food preparation device, such as device 900, may be enclosed in an insulated enclosure, such as enclosure 914. Such an enclosure may be made of any suitable insulative material, such as a polymer. In some embodiments, the enclosure is made of metal. Enclosure 914 is configured to provide insulation between device 900 and the ambient environment that surrounds device 900. Accordingly, enclosure 914 is configured to reduce an amount of thermal transfer or exchange between device 900 and the ambient environment. In some embodiments, such as when device 900 is configured as a cooker, this may increase the amount of thermal energy transferred to the thermal conduits such as thermal conduits 904 and 906. For example, a thermal conduit associated with thermal transfer devices may transfer more heat to fluid pumped through the thermal conduit, and may increase the amount of heat provided to a downstream component.

Figure 10:
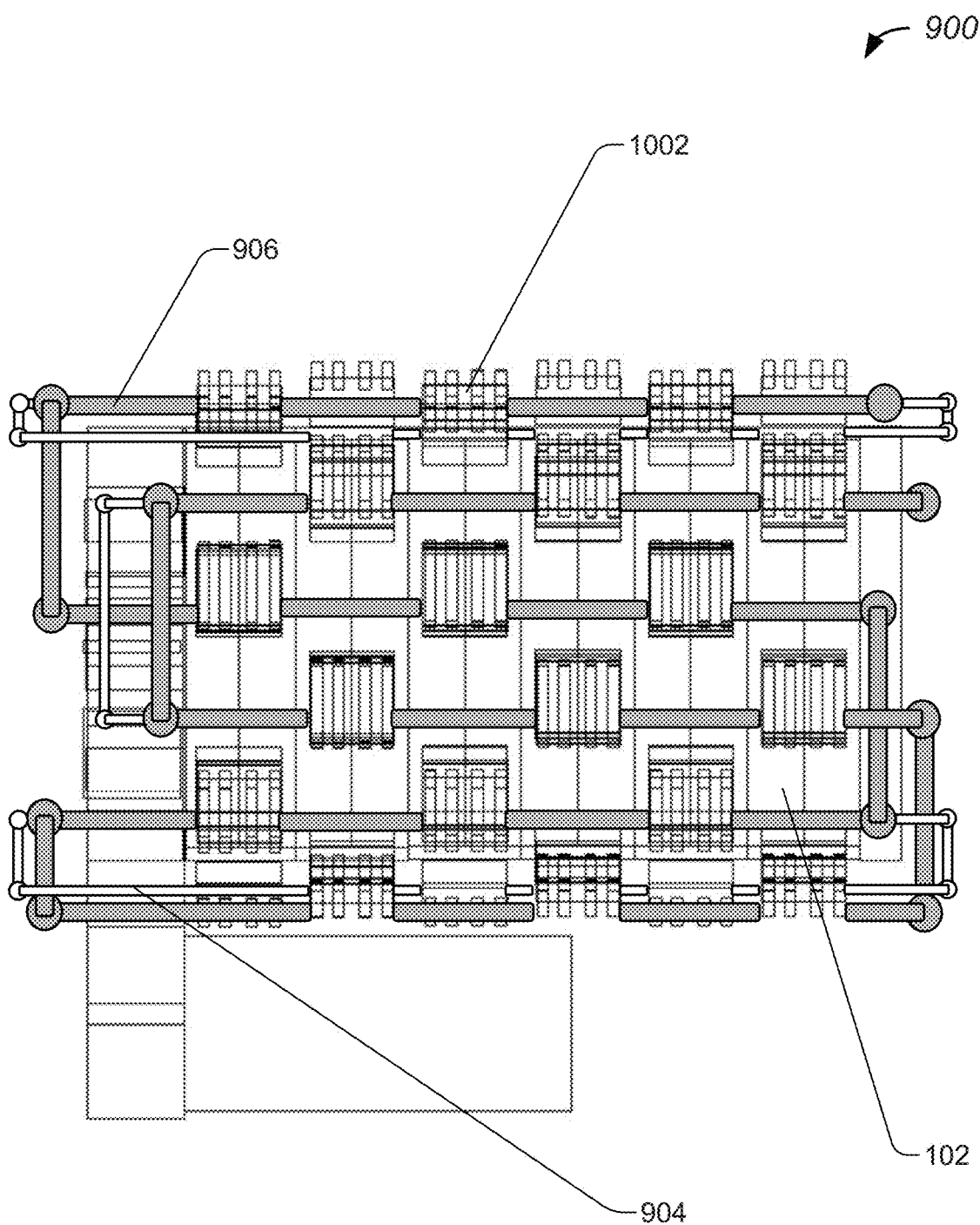
FIG. 10 illustrates a side view of an example of a programmable food preparation device, configured in accordance with some embodiments.

FIG. 10 illustrates a side view of an example of a programmable food preparation device 900, configured in accordance with some embodiments. As discussed above with reference to device 900 of FIGS. 9A and 9B, a programmable food preparation device, such as device 900, includes a container, such as container 102, as well as various thermoelectric devices, such as thermoelectric device 110, coupled with thermal transfer devices, such as thermal transfer devices 902 and 903, and configured as what may be referred to herein as thermal transfer assemblies, such as thermal transfer assembly 1002. Accordingly, a particular thermal transfer assembly 1002 includes a thermoelectric device, such as thermoelectric device 110, as well as a first thermal transfer device coupled to a first side of the thermoelectric device, and a second thermal transfer device coupled to a second side of the thermoelectric device, such as thermal transfer devices 902 and 903.

Furthermore, device 900 includes first thermal conduit 904 and second thermal conduit 906. As shown in FIG. 10, thermal transfer assemblies 1002 may be arranged in staggered rows or columns. Accordingly, tubing of a particular thermal conduit may be inserted through holes of a first column, then inserted through holes of a second column, etc. until all columns have been coupled with the thermal conduit. As further illustrated in FIG. 10, first thermal conduit 904 and second thermal conduit 906 may be aligned such that second thermal conduit 906 overlays, in part, first thermal conduit 904. In this way, both thermal conduits may be coupled to all of their associated thermal transfer assemblies.

Figure 11:
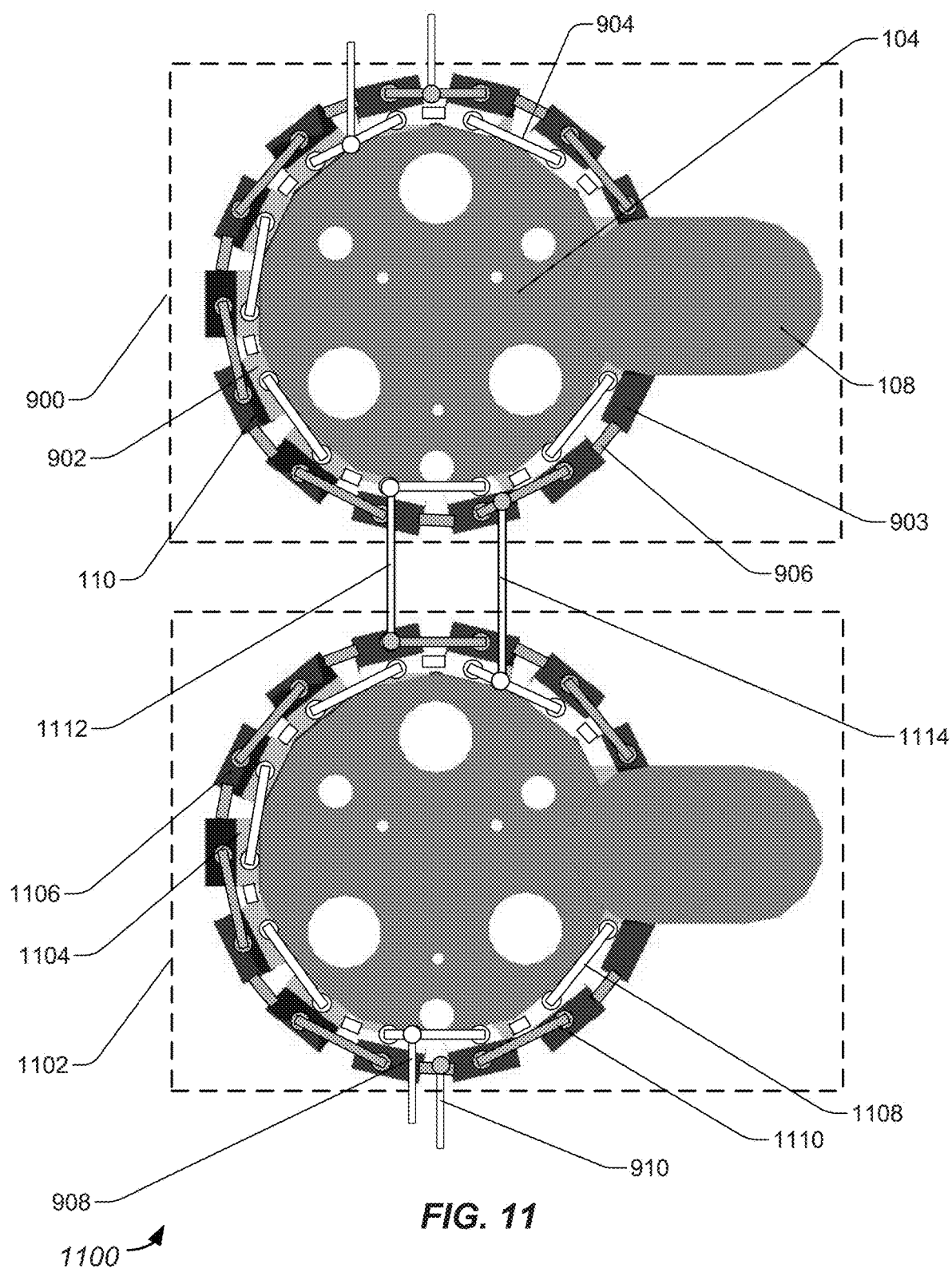
FIG. 11 illustrates an example of a programmable food preparation system, configured in accordance with some embodiments.

FIG. 11 illustrates an example of a programmable food preparation system 1100, configured in accordance with some embodiments. As disclosed herein, a food preparation system, such as system 1100, may include multiple different programmable food preparation devices, such as device 900 discussed above with reference to FIGS. 9A, 9B, and 10. Such food preparation devices may be coupled with each other in series. In various embodiments, system 1100 includes two programmable food preparation devices such as device 900 and device 1102. As similarly discussed above, each programmable food preparation device included in system 1100, such as device 900 and device 1102, includes a container, such as container 102, which is bounded by plates, such as plate 104, and an associated motor, such as motor 108. Programmable food preparation devices such as device 900 and device 1102, also include thermoelectric devices such as thermoelectric device 110, thermal transfer devices such as thermal transfer device 902 and 903, and thermal conduits such as first thermal conduit 904 and second thermal conduit 906. As shown in FIG. 11, device 1102 includes third thermal conduit 1108 and fourth thermal conduit 1110.

In some embodiments, device 900 is configured as a cooker, and is configured to receive a first current at the thermoelectric devices 110 associated with the device 900. Accordingly, the thermoelectric devices 110 are configured to transfer heat to thermal transfer devices such as thermal transfer device 902 and a container of device 900. Moreover, heat is transferred to first thermal conduit 904 and fluid that may be pumped through first thermal conduit 904 is heated. Furthermore, when in this configuration, the thermoelectric devices 110 transfer heat away from and cool thermal transfer devices such as thermal transfer device 903. Furthermore, thermal energy is transferred away from second thermal conduit 906, and fluid pumped through second thermal conduit 906 is cooled.

In various embodiments, device 1102 is configured as a cooler, and is configured to receive a second current at the thermoelectric devices 110 associated with the device 1102. Accordingly, the thermoelectric devices 110 are configured to transfer thermal energy away from thermal transfer devices such as thermal transfer device 1104, and a container of device 1102. Furthermore, heat is transferred away from third thermal conduit 1108 and fluid that may be pumped through third thermal conduit 1108 is cooled. When in this configuration, the thermoelectric devices 110 transfer heat to and heat thermal transfer devices such as thermal transfer device 1106. Furthermore, thermal energy is transferred to fourth thermal conduit 1110, and fluid pumped through fourth thermal conduit 1110 is heated.

In some embodiments, thermal conduits of device 900 and device 1102 are coupled with each other. For example, first thermal conduit 904 is coupled with fourth thermal conduit 1110 via conduit 1112, and second thermal conduit 906 is coupled with third thermal conduit 1108 via conduit 1114. As discussed above, first thermal conduit 904 and fourth thermal conduit 1110 are both configured to receive heat and heat water pumped through them. Moreover, second thermal conduit 906 and third thermal conduit 1108 are both configured to have heat drawn away from second thermal conduit 906 and third thermal conduit 1108 as well as water pumped through second thermal conduit 906 and third thermal conduit 1108, thus cooling second thermal conduit 906 and third thermal conduit 1108. As shown in FIG. 11, the thermal conduits may be coupled in series as part of the same thermal circuit. For example, a first thermal pathway may include first thermal conduit 904 and fourth thermal conduit 1110. Thus, within the first thermal pathway water is pumped from and through first thermal conduit 904, through fourth thermal conduit 1110, and out to another component or system via interface 910. A second thermal pathway may include second thermal conduit 906 and third thermal conduit 1108. Accordingly, within the second thermal pathway water is pumped from and through second thermal conduit 906, through third thermal conduit 1108, and out to another component or system via interface 908. As previously discussed return paths from the downstream components may be provided to close the thermal pathways.

FIG. 12 illustrates another example of a food preparation system 1200, configured in accordance with some embodiments. As discussed above with reference to FIG. 11, a food preparation system, such as system 1200, may include multiple different programmable food preparation devices, such as devices 900 and 1100 discussed above with reference to FIGS. 9A, 9B, 10, and 11. For example, two food preparation devices 900 and 1102 may be coupled with each other to establish, at least in part, two thermal pathways. FIG. 12 further illustrates how such pathways may be coupled with other vehicle components, such as first component 1202 and second component 1204. As discussed above, device 900 and device 1102 include thermal conduits, such as thermal conduits 904, 906, 1108, and 1110, that are coupled with each other to establish contiguous thermal pathways. Interfaces or ports such as interface 908 and interface 910, couple the thermal conduits to other thermal conduits of the environment in which system 1200 is implemented, which may be an aircraft, spacecraft, or space station.

As shown in FIG. 12, in one example, thermal conduits 1108 and 1110 of device 1102 are coupled to first component 1202 and second component 1204. Moreover, first component 1202 and second component 1204 are coupled to device 900. As previously discussed, thermal conduits 904 and 906 of device 900 are coupled with thermal conduits 1108 and 1110 of device 1102. Accordingly, closed loops are formed in which thermal energy is circulated along various pathways including programmable food preparation devices and vehicle components.

In one example, first pathway 1206 receives thermal energy from device 900 and device 1102 in the form of heat. As discussed above, device 900 can be configured as a cooker and device 1102 can be configured as a cooler. Accordingly, thermal conduits 904 and 1110 of device 900 and device 1102 that are heated are coupled such that thermal conduits 904 and 1110 provide thermal energy to first pathway 1206. As shown in FIG. 12, the thermal conduits 904 and 1110 are coupled in series. Moreover second pathway 1208 is also thermally coupled to device 900 and device 1102. When device 900 is configured as a cooker and device 1102 is configured as a cooler, additional thermal conduits 906 and 1108 of device 900 and device 1102 are cooled and are coupled such that thermal conduits 906 and 1108 cool second pathway 1208. Accordingly, first component 1202 is heated by virtue of coupling with first pathway 1206, and second component 1204 is cooled by virtue of coupling with second pathway 1208.

In some embodiments, the thermal conduits 904, 906, 1108, and 1110 are circulation systems that include a hollow pathway, such as a tube or pipe, that is filled with a fluid, such as water, that is circulated throughout the thermal conduits. Accordingly, each thermal pathway, such as pathways 1206 and 1208, may have dedicated pump responsible for establishing flow within each respective pathway. For example, first pathway 1206 has first pump 1210 and second pathway 1208 has second pump 1212. The operation of the pumps may be controlled by control circuitry 1214 that includes control logic configured to control the enabling and disabling, as well as speed of the pumps 1210 and 1212 based on the determinations of system needs and availability discussed above. Moreover, first pump 1210 and second pump 1212 may each include flow sensors configured to provide rate of flow measurements that are provided to the control circuitry 1214.

In a specific example of a particular configuration of device 900 and device 1100, thermal conduits 904 and 1110 may be associated with heating operations. The control circuitry 1214 is configured to determine if more or less heat is being produced than is required to cook the food ingredients. Such determinations may be made based on temperatures of thermal conduits 904 and 1110, associated thermal transfer devices, and/or appropriate sides of the thermoelectric devices 110. If it is determined that the thermal conduits 904 and 1110, associated thermal transfer devices, and/or appropriate side of the thermoelectric devices 110 are hotter than required by a recipe, the control circuitry 1214 is configured to activate a pump, such as first pump 1210, or increase a flow associated with a pump, such as first pump 1210, thus enabling or increasing coupling between the thermal conduits 904 and 1110, and vehicle component 1202. If the control circuitry 1214 determines that less heat is being produced than required, the control circuitry 1214 is configured to disable or decrease a flow rate of first pump 1210, thus disabling or decreasing coupling with vehicle component 1202. In various embodiments, such coupling may also be determined based on temperatures of the target vehicle component, such as vehicle component 1202. For example, if vehicle component 1202 requires heating and is close to a target temperature, thermal coupling may be increased. However, if vehicle component 1202 requires heating but is far from a target temperature, thermal coupling may be decreased because expenditure of such heat on vehicle component 1202 may be inefficient, and may be better utilized on another vehicle component that may be coupled to the same thermal conduit and may be closer to the other vehicle component's own target temperature.

Similarly, for a thermal conduit associated with cooling operations, such as thermal conduits 906 and 1108, the control circuitry 1214 is configured to determine if the thermal conduits 906 and 1108, associated thermal transfer devices, and/or appropriate side of the thermoelectric devices 110 are cooler than required by the recipe. If such a determination is made, the control circuitry 1214 is configured activate a pump, or increase a flow associated with the pump, such as second pump 1212, thus enabling or increasing coupling between a thermal conduits 906 and 1108, and vehicle component 1204. If the control circuitry determines that the thermal conduits 906 and 1108, thermal transfer devices, and/or appropriate side of the thermoelectric devices 110 are not as cold as required, the control circuitry is configured to disable or decrease a flow rate of second pump 1212, thus disabling or decreasing coupling with vehicle component 1204. As similarly discussed above, such coupling may also be determined based on temperatures of the target vehicle component, such as vehicle component 1204. For example, if vehicle component 1204 requires cooling and is close to a target temperature, thermal coupling may be increased. However, if vehicle component 1204 requires cooling but is far from a target temperature, thermal coupling may be decreased because expenditure of such cooling on vehicle component 1204 may be inefficient, and may be better utilized on another vehicle component that may be coupled to the same thermal conduit and may be closer to the other vehicle component's own target temperature.

In various embodiments, the control circuitry may be command and control circuitry, such as control circuitry 1214. Accordingly, control circuitry 1214 may be communicatively coupled with both device 900 and device 1102. Moreover, in some embodiments, control circuitry 1214 is also communicatively coupled with first pump 1210 and second pump 1212. Accordingly, control circuitry 1214 is configured to control the operation of device 900 and device 1102, as well as the operation of first pump 1210 and second pump 1212. Furthermore, according to some embodiments, control circuitry 1214 is coupled with additional control circuitry, such as thermal control computer 1216 which may be a computer system such as data processing system 1500 discussed in greater detail below. In various embodiments, thermal control computer 1216 is configured to control and regulate thermal conditions across many portions and systems of the vehicle that includes system 1200. Accordingly, thermal control computer 1216 may control and thermally regulate other areas of an aircraft or spacecraft, such as a payload bay. In this example, control circuitry 1214 may exert local control over device 900 and device 1102 while thermal control computer 1216 exerts global control over various other components and systems of the vehicle that includes system 1200. In this way, control circuitry 1214 may receive information about other vehicle systems, and control circuitry 1214 may control device 900 and device 1102 as well as first pump 1210 and second pump 1212 based on such received information.

Figure 13:
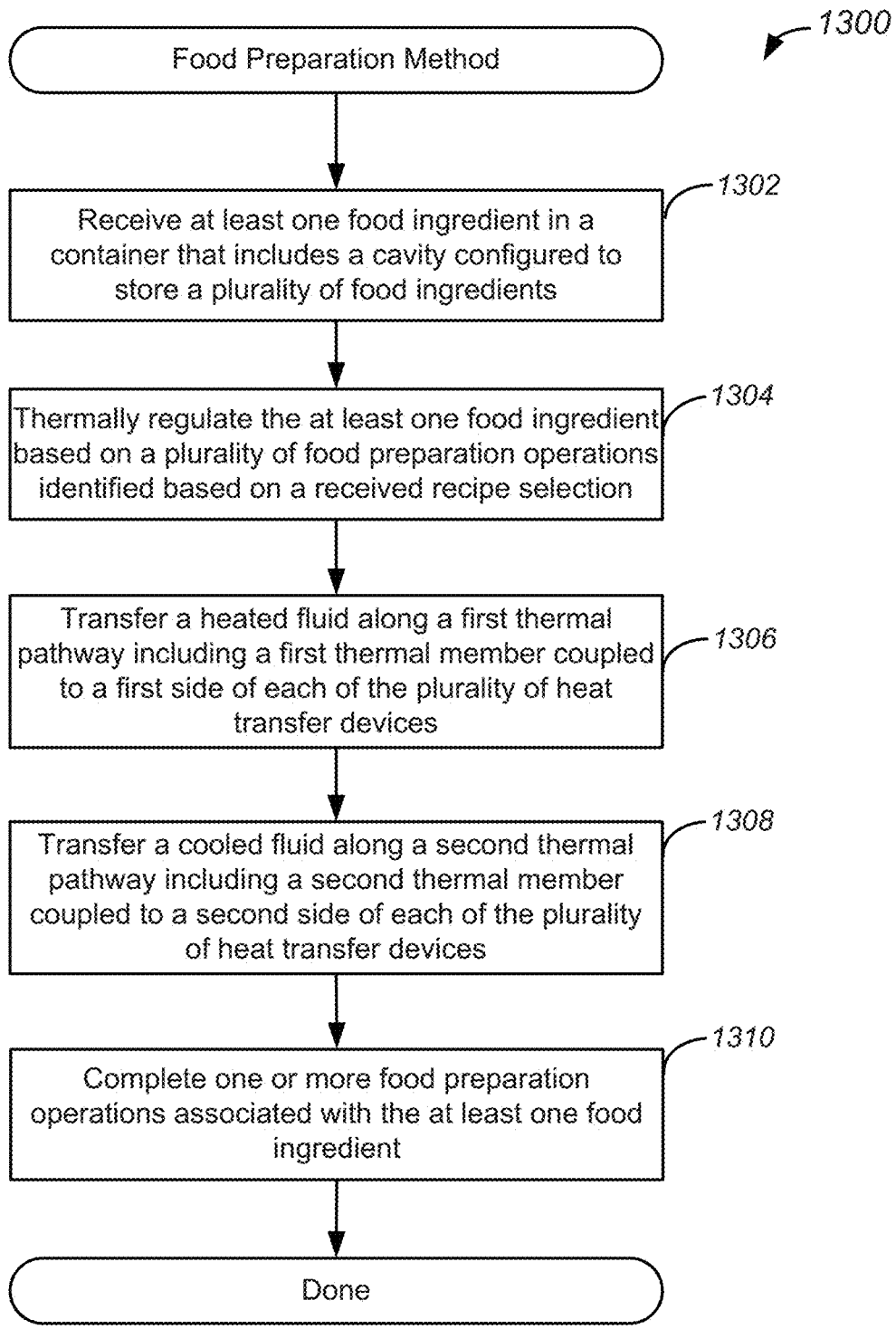
FIG. 13 illustrates a flow chart of an example of a method for using a programmable food preparation device, implemented in accordance with some embodiments.

FIG. 13 illustrates a flow chart of an example of a method for using a food preparation device, such as devices 900 and 1100 (shown in FIGS. 9A, 9B, 10, 11, and 12), implemented in accordance with some embodiments. Method 1300 may commence with operation 1302 during which at least one food ingredient is received in a container, such as container 102, that includes a cavity configured to store a plurality of food ingredients. As discussed above with reference to FIG. 7, various ingredients may be added to the container 102 in order to prepare a particular food recipe that has been selected for preparation.

Method 1300 may proceed to operation 1304 during which the at least one food ingredient is thermally regulated based on a plurality of food preparation operations identified based on a received recipe selection. In various embodiments, the regulating uses a plurality of thermoelectric devices 110 coupled to the container 102. Accordingly, as discussed above, the ingredients that were added to the container 102 may be heated and/or cooled in accordance with a selected recipe. As previously discussed, the heating and cooling operations may be controlled by control circuitry 1214 and/or other components of a data processing system 1500 in accordance with the recipe. Thus, various cooking operations may be performed on the ingredients to prepare the food.

Method 1300 may proceed to operation 1306 during which a heated fluid is transferred along a first thermal pathway including a first thermal conduit, such as thermal conduit 904, coupled to a first side of each of the plurality of thermoelectric devices 110. As discussed above, during the preparation of the food, a particular side of the thermoelectric devices 110 as well as thermal transfer devices coupled to that particular side are heated. Moreover, a thermal conduit, such as thermal conduit 904, that is coupled to the thermal transfer devices is heated as well to provide thermal energy to a thermal pathway. In various embodiments, the thermal pathway is coupled to a vehicle component, such as second vehicle component 1204. Accordingly, fluid included in the thermal conduit 904 may be heated and pumped through the thermal pathway to the vehicle component. In this way, heat may be provided to the vehicle component during one or more cooking operations.

Method 1300 may proceed to operation 1308 during which a cooled fluid is transferred along a second thermal pathway including a second thermal conduit, such as thermal conduit 906, coupled to a second side of each of the plurality of thermoelectric devices 110. As similarly discussed above, during the preparation of the food, another side of the thermoelectric devices 110 as well as thermal transfer devices coupled to that side are cooled. Moreover, an additional thermal conduit, such as thermal conduit 906, that is coupled to the thermal transfer devices is cooled as well to reduce thermal energy in another thermal pathway. In various embodiments, the second thermal pathway is coupled to another vehicle component, such as first vehicle component 1202. Accordingly, fluid included in the additional thermal conduit may be cooled and pumped through the other thermal pathway to the other vehicle component. In this way, cooled fluid may be provided to the other vehicle component during the cooking operations.

Method 1300 may proceed to operation 1310 during which one or more food preparation operations may be completed. Accordingly, food preparation operations associated with the at least one food ingredient received at operation 1302 may be implemented and completed in accordance with the food preparation methods described above. In this way, food preparation operations may be implemented to prepare food in accordance with a particular recipe, and heating or cooling associated with such food preparation may be used to heat and cool other components of a vehicle or spacecraft at the same time.

Figure 14:
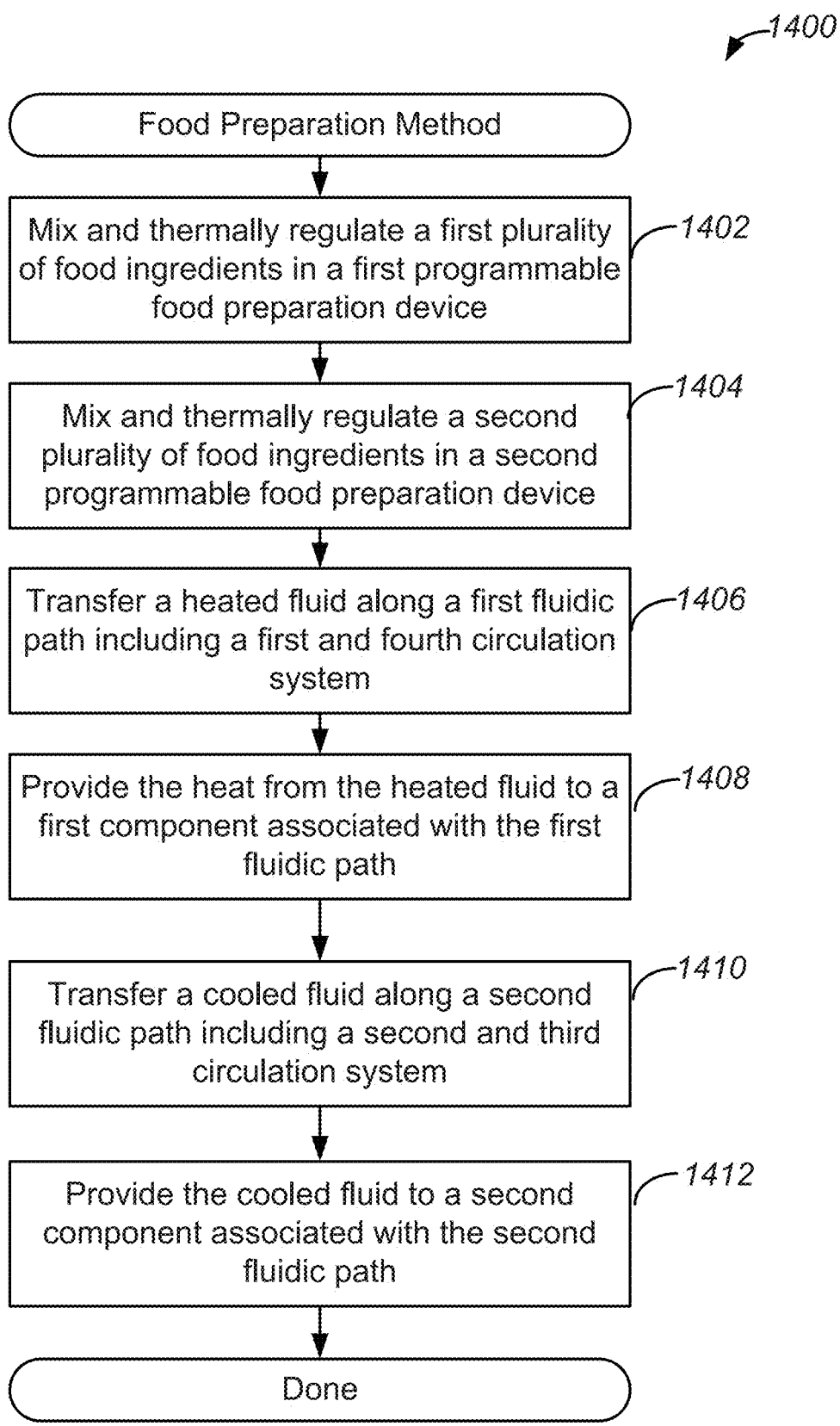
FIG. 14 illustrates a flow chart of another example of a method for using a programmable food preparation device, implemented in accordance with some embodiments.

FIG. 14 illustrates a flow chart of another example of a method for using programmable food preparation devices, such as devices 900 and 1100 (shown in FIGS. 9A, 9B, 10, 11, and 12), implemented in accordance with some embodiments. Method 1400 may commence with operation 1402 during which a first plurality of food ingredients is mixed and thermally regulated in a first programmable food preparation device, such as device 900. In various embodiments, the first programmable food preparation device has a first configuration in which the first device is configured to receive a first current that configures the first programmable food preparation device as a cooker that applies thermal energy to a container of the first programmable food preparation device as heat to cook the first plurality of food ingredients.

Method 1400 may proceed to operation 1404 during which a second plurality of food ingredients is mixed and thermally regulated in a second programmable food preparation device, such as device 1100. In various embodiments, the second programmable food preparation device has a second configuration in which the second device is configured to receive a second current that configures the second programmable food preparation device as a cooler that withdraws thermal energy from a container of the second programmable food preparation device to cool the second plurality of food ingredients.

Method 1400 may proceed to operation 1406 during which heat is transferred along first thermal path. As similarly discussed above, a first thermal pathway includes a first thermal conduit of the first programmable food preparation device and a fourth thermal conduit of the second programmable food preparation device, such as thermal conduits 904 and 1110, which are each configured to include thermal transfer devices that heat the contents of the first and fourth thermal conduits. As also discussed above, the contents of the thermal conduits are fluids, such as water, that are heated to transfer thermal energy as heat to other systems and components further downstream within the first thermal path. Accordingly, during operation 1406, a first pump actively pumps water through the first and fourth thermal conduits, which may be thermal conduits 904 and 1110, during which the water is heated, and the first pump, such as first pump 1210, continues to pump the heated water downstream, as will be discussed in greater detail below.

Accordingly, method 1400 may proceed to operation 1408 during which the heated water in the first thermal pathway is provided to a first component. In some embodiments, the first component is a component such as first component 1202, which may be included in an aircraft, spacecraft, or space station that utilizes one or more heating systems to stay within operational thermal tolerances. For example, the first component may be a heater used for environmental control of ambient temperature. In this example, the first thermal pathway extends around the heater, and augments the heat generated by the heater via a first thermal interface.

Method 1400 may proceed to operation 1410 during which thermal energy is reduced along a second thermal path. As similarly discussed above, a second thermal pathway includes a second thermal conduit of the first programmable food preparation device and a third thermal conduit of the second programmable food preparation device, such as thermal conduits 906 and 1108, which are each configured to include thermal transfer devices that cool the contents of the second and third thermal conduits. As also discussed above, the contents of the thermal conduits 906 and 1108 are fluids, such as water, that are cooled to provide cooling to other systems and components further downstream within the second thermal path. Accordingly, during operation 1410, a second pump, such as second pump 1212, may actively pump water through the second and third thermal conduits, which may be thermal conduits 906 and 1108, during which the water is cooled as thermal energy is withdrawn from the water, and the second pump may continue to pump the cooled water downstream, as will be discussed in greater detail below.

Method 1400 may proceed to operation 1412 during which the cooled water in the second thermal pathway is provided to a second component, such as second component 1204. As similarly discussed above, the second component 1204 is a component of an aircraft, spacecraft, or space station that utilizes one or more cooling systems to remain within operational thermal tolerances. For example, the second component 1204 may be a motor that generates heat by virtue of its operation. In this example, the second thermal pathway extends around the motor, and cools the motor via a second thermal interface. While method 1400 discusses the tandem implementation of two food preparation devices 900 and 1100, in various embodiments, at least one or more of operation 1402 or 1404 may be implemented optionally, as may be the case when one food preparation device, such as device 900, is used to cook food ingredients.

FIG. 15 illustrates a data processing system configured in accordance with some embodiments, such as device 100 (shown in FIG. 1), device 200 (shown in FIG. 2), device 400 (shown in FIG. 4), as well as device 500, device 600 (shown in FIGS. 5A, 5B, 6A, and 6B), device 900 (shown in FIGS. 9A, 9B, 10, 11, and 12), and device 1102 (shown in FIGS. 11 and 12). Thus, according to some embodiments, a system for preparing food is disclosed herein that may include one or more components of a device, such as device 100 (shown in FIG. 1), device 200 (shown in FIG. 2), device 400 (shown in FIG. 4), as well as device 500, device 600 (shown in FIGS. 5A, 5B, 6A, and 6B), and device 900 (shown in FIGS. 9A, 9B, 10, 11, and 12), and device 1102 (shown in FIGS. 11 and 12), as well as one or more components of a data processing system, such as system 1500 discussed in greater detail below.

In some embodiments, one or more components of system 1500 may be implemented as on board components of the food preparation device, and/or implemented within a laptop, an external hand held device, or built into a keypad/touchscreen display on the food preparation device. For example, time and safety critical control operations and monitoring may be embedded within one or more components of the food preparation device. For example, control circuitry, such as control circuitry 1505, is configured to include discrete electronic control logic that may be implemented to regulate the thermoelectric devices included within the food preparation device, as well as operation of various components associated with thermal conduits, as discussed above. In some embodiments, the control circuitry may include a microprocessor, memory, and/or other logic circuits. In some embodiments, such control circuitry may be implemented in reprogrammable logic, and may be dynamically reprogrammable, or may include a programmable memory. Accordingly, in some embodiments, operation of control circuitry 1505, and similarly control circuitry 1214 discussed above, may be controlled and programmed by data processing system 1500 and computer program product 1522. While shown as implemented in data processing system 1500, as discussed above, control circuitry 1505 may be implemented externally and adjacent to programmable food preparation devices, as shown above with control circuitry 1214. According to various embodiments, the distribution of the computing functions and/or hardware may be determined based on one or more requirements of space flight, commercial flight, or commercial product certification. Moreover, according to some embodiments, one or more components of system 1500 may be implemented external to the food preparation device. For example, data may be collected by on board sensors and provided to an external control computer system for analysis.

In various embodiments, data processing system 1500, also referred to herein as a computer system, may be used to implement one or more computers used in a controller or other components of systems described above. In some embodiments, data processing system 1500 includes communications framework 1502, which provides communications between processor unit 1504, memory 1506, persistent storage 1508, communications unit 1510, input/output (I/O) unit 1512, and display 1514. In this example, communications framework 1502 may take the form of a bus system.

Processor unit 1504 serves to execute instructions for software that may be loaded into memory 1506. Processor unit 1504 may be a number of processors, a multi-processor core, or some other type of processor, depending on the particular implementation.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Storage devices 1516 may also be referred to as computer readable storage devices in these illustrative examples. Memory 1506, in these examples, may be, for example, a random access memory or any other suitable volatile or non-volatile storage device. Persistent storage 1508 may take various forms, depending on the particular implementation. For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these illustrative examples, provides for communications with other data processing systems or devices. In these illustrative examples, communications unit 1510 may be a network interface card, universal serial bus (USB) interface, or other suitable communications device/interface.

Input/output unit 1512 allows for input and output of data with other devices that may be connected to data processing system 1500. For example, input/output unit 1512 may provide a connection for user input through a keyboard, a mouse, and/or some other suitable input device. Further, input/output unit 1512 may send output to a printer. Display 1514 provides a mechanism to display information to a user.

Instructions for the operating system, applications, and/or programs may be located in storage devices 1516, which are in communication with processor unit 1504 through communications framework 1502. The processes of the different embodiments may be performed by processor unit 1504 using computer-implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these illustrative examples. In one example, computer readable media 1520 may be computer readable storage media 1524 or computer readable signal media 1526.

In these illustrative examples, computer readable storage media 1524 is a physical or tangible storage device used to store program code 1518 rather than a medium that propagates or transmits program code 1518.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1500 are not meant to provide architectural limitations to the manner in which different embodiments may be implemented. The different illustrative embodiments may be implemented in a data processing system including components in addition to and/or in place of those illustrated for data processing system 1500. Other components shown in FIG. 15 can be varied from the illustrative examples shown. The different embodiments may be implemented using any hardware device or system capable of running program code 1518.

Figure 16:
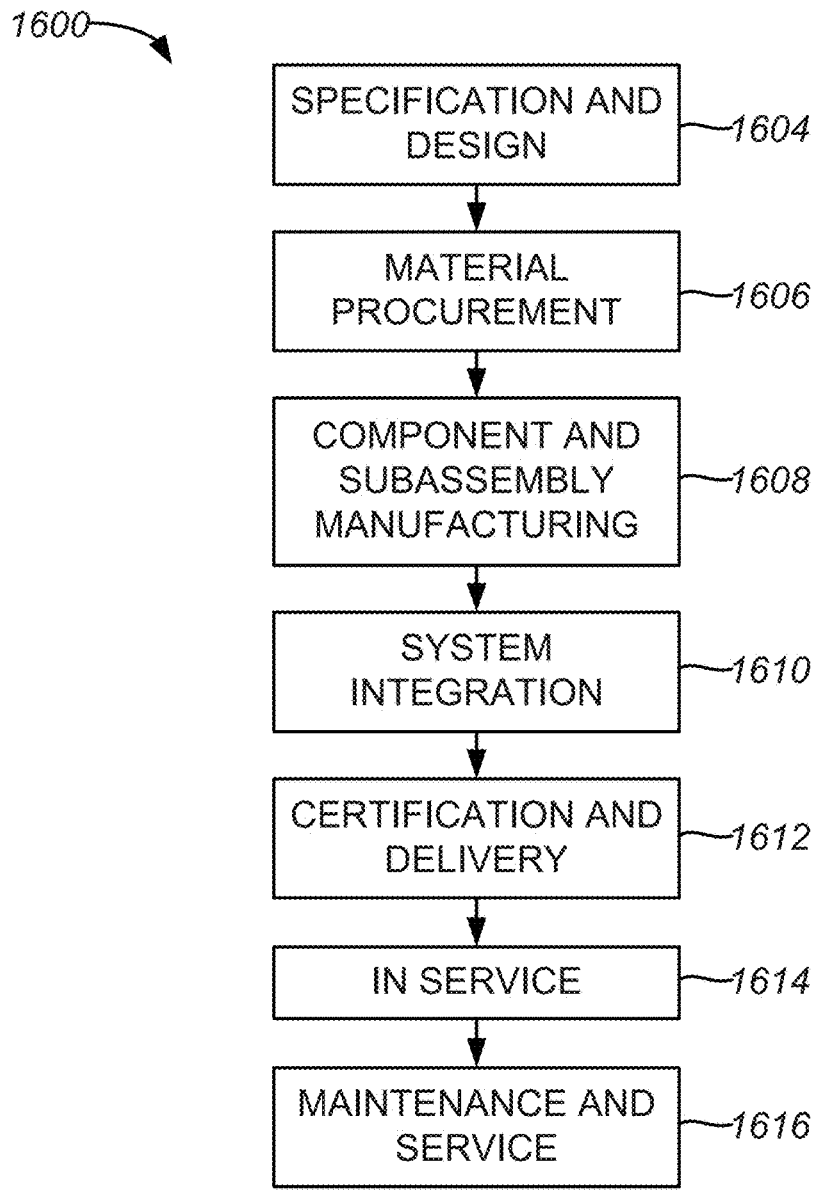
FIG. 16 illustrates a flow chart of an example of an aircraft production and service methodology, implemented in accordance with some embodiments.
Figure 17:
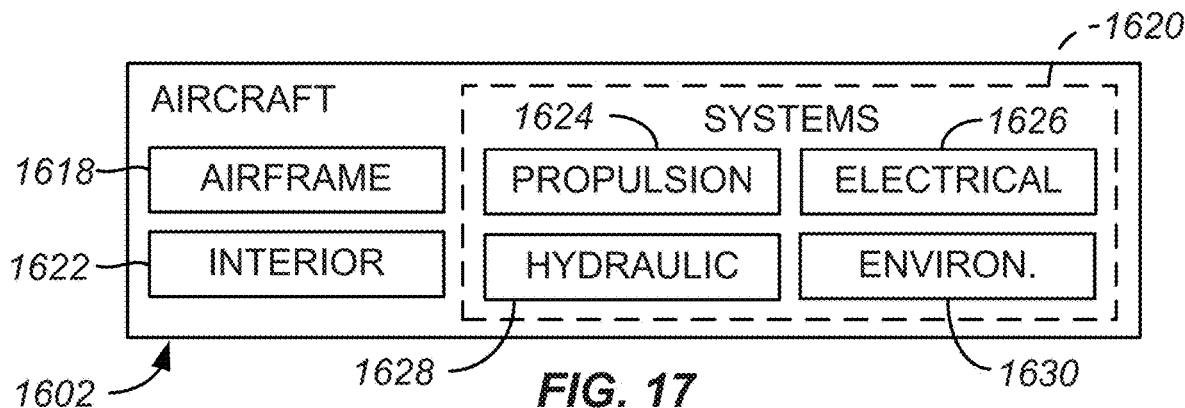
FIG. 17 illustrates a block diagram of an example of an aircraft, implemented in accordance with some embodiments.

As discussed above, various embodiments of food preparation devices disclosed herein, such as device 100 (shown in FIG. 1), device 200 (shown in FIG. 2), device 400 (shown in FIG. 4), as well as device 500, device 600 (shown in FIGS. 5A, 5B, 6A, and 6B), device 900 (shown in FIGS. 9A, 9B, 10, 11, and 12), and device 1102 (shown in FIGS. 11 and 12) may be integrated with aircraft and spacecraft. Accordingly, the manufacture and installation of such food preparation devices may occur in the context of an aircraft/spacecraft manufacturing and service method 1600 as shown in FIG. 16 and an aircraft 1602 as shown in FIG. 17. During pre-production, illustrative method 1600 may include specification and design 1604 of the aircraft 1602 and material procurement 1606. During production, component and subassembly manufacturing stages 1608 and system integration 1610 of the aircraft 1602 takes place. Thereafter, the aircraft 1602 may go through certification and delivery 1612 in order to be placed in service 1614. While in service by a customer, the aircraft 1602 is scheduled for routine maintenance and service 1616 (which may also include modification, reconfiguration, refurbishment, and so on).

Each of the processes of method 1600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 17, the aircraft 1602 produced by illustrative method 1600 may include an airframe 1618 with a plurality of systems 1620 and an interior 1622. Examples of high-level systems 1620 include one or more of a propulsion system 1624, an electrical system 1626, a hydraulic system 1628, and an environmental system 1630. Any number of other systems may be included. In various embodiments, food preparation devices, such as device 140 (shown in FIG. 1), device 200 (shown in FIG. 2), device 400 (shown in FIG. 4), as well as device 500, device 600 (shown in FIGS. 5A, 5B, 6A, and 6B), device 900 (shown in FIGS. 9A, 9B, 10, 11, and 12), and device 1102 (shown in FIGS. 11 and 12) may be implemented with systems included in various aircraft and aerospace systems, such as systems 1620 or components implemented in interior 1622. Although an aerospace example is shown, the principles of the embodiments described herein may be applied to other industries, such as the automotive industry.

Devices and methods embodied herein may be employed during any one or more of the stages of the production and service method 1600. For example, components or subassemblies corresponding to production stages 1608 and 1610 may be fabricated or manufactured in a manner similar to components or subassemblies produced while the aircraft 1602 is in service. Also, one or more device embodiments, method embodiments, or a combination thereof may be utilized during the production stages 1608 and 1610, for example, by substantially expediting assembly of or reducing the cost of an aircraft 1602. Similarly, one or more of device embodiments, method embodiments, or a combination thereof may be utilized while the aircraft 1602 is in service, for example and without limitation, to maintenance and service 1616.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A device for preparing food, the device comprising:
a container comprising a cavity configured to store at least one food ingredient, wherein the cavity defines an internal volume of the container;
a first plate coupled to a first end of the container, wherein the first plate includes at least one hole configured to receive the at least one food ingredient;
a second plate coupled to a second end of the container;
a plurality of thermoelectric devices coupled to the container, wherein the plurality of thermoelectric devices is configured to exchange thermal energy with the container;
a first thermal conduit coupled to a first side of each of the plurality of thermoelectric devices and configured to exchange thermal energy with at least the first side of each of the plurality of thermoelectric devices; and
a second thermal conduit coupled to a second side of each of the plurality of thermoelectric devices and configured to exchange thermal energy with at least the second side of each of the plurality of thermoelectric devices,
wherein the first thermal conduit is configured to circulate a fluid and is coupled to a first pump, and wherein the second thermal conduit is configured to circulate a fluid and is coupled to a second pump.

2. The device of claim 1, wherein the first thermal conduit is coupled to the first side of each of the plurality of thermoelectric devices via a first plurality of thermal transfer devices, wherein the second thermal conduit is coupled to the second side of each of the plurality of thermoelectric devices via a second plurality of thermal transfer devices, wherein the first side faces towards the container, and wherein the second side faces away from the container.

3. The device of claim 2, wherein the plurality of thermoelectric devices comprises a plurality of Peltier devices.

4. The device of claim 1 further comprising control circuitry operatively coupled to the plurality of thermoelectric devices.

5. The device of claim 4, wherein the control circuitry is configured to control the plurality of thermoelectric devices based, at least in part, on a first amount of energy associated with the device and a second amount of energy associated with a vehicle component external to the device for preparing food.

6. The device of claim 1, wherein the first thermal conduit is coupled to a first thermal pathway, and where the second thermal conduit is coupled to a second thermal pathway.

7. The device of claim 6, wherein first thermal pathway and the second thermal pathway are coupled with at least one of a group consisting of: an environmental system, a payload area, a cryogenic system, an air exchanger, an avionics fan, and an air handler.

8. The device of claim 1, wherein the device is included on a spacecraft.

9. A system for preparing food, the system comprising:
a first programmable food preparing device comprising:
a first container comprising a first cavity defining a first internal volume of the first container;
a first plurality of plates bounding the first internal volume of the first container and comprising at least one hole configured to receive at least one food ingredient;
a first plurality of thermoelectric devices coupled to the container and configured to exchange thermal energy with the container;
a first plurality of thermal conduits coupled to a first side and a second side of each of the plurality of thermoelectric devices and configured to exchange thermal energy with at least the first side of each of the plurality of thermoelectric devices, wherein the first plurality of thermal conduits is configured to circulate a fluid and is coupled to at least a first pump; and
a second programmable food preparing device comprising:
a second container including a second cavity defining a second internal volume of the second container;
a second plurality of plates bounding the second internal volume of the second container and comprising at least one hole configured to receive at least one food ingredient;
a second plurality of thermoelectric devices coupled to the container and configured to exchange thermal energy with the container; and
a second plurality of thermal conduits coupled to a third and fourth side of each of the second plurality of thermoelectric devices and configured to exchange thermal energy with at least the second side of each of the plurality of thermoelectric devices, wherein the second plurality of thermal conduits is configured to circulate a fluid and is coupled to at least a second pump.

10. The system of claim 9, wherein the first plurality of thermal conduits comprises a first thermal conduit and a second thermal conduit, wherein the second plurality of thermal conduits comprises a third thermal conduit and a fourth thermal conduit.

11. The system of claim 10, wherein the first thermal conduit is configured to circulate heated fluid, wherein the second thermal conduit is configured to circulate cooled fluid, wherein the third thermal conduit is configured to circulate cooled fluid, and wherein the fourth thermal conduit is configured to circulate heated fluid.

12. The system of claim 11, wherein the first thermal conduit is coupled to the fourth thermal conduit in series in a first thermal pathway, and wherein the second thermal conduit and the third thermal conduit are coupled in series in a second thermal pathway.

13. The system of claim 12, wherein the first thermal pathway is provided to a first spacecraft component, and wherein the second thermal pathway is provided to a second spacecraft component.

14. A method for preparing food, the method comprising:
receiving at least one food ingredient in a container comprising a cavity configured to store a plurality of food ingredients;
thermally regulating the at least one food ingredient based on a plurality of food preparation operations identified based on a received recipe selection, the regulating using a plurality of thermoelectric devices coupled to the container;

transferring a heated fluid along a first thermal pathway including a first thermal conduit coupled to a first side of each of the plurality of thermoelectric devices and exchanging thermal energy with at least the first side of each of the plurality of thermoelectric devices; and transferring a cooled fluid along a second thermal pathway including a second thermal conduit coupled to a second side of each of the plurality of thermoelectric devices and exchanging thermal energy with at least the second side of each of the plurality of thermoelectric devices, wherein the first thermal conduit circulates a fluid and is coupled to a first pump, and wherein the second thermal conduit circulates a fluid and is coupled to a second pump.

15. The method of claim 14, wherein the first thermal conduit is coupled to the first side of each of the plurality of thermoelectric devices via a first plurality of thermal transfer devices, wherein the second thermal conduit is coupled to the second side of each of the plurality of thermoelectric devices via a second plurality of thermal transfer devices, wherein the first side faces towards the container, and wherein the second side faces away from the container.

16. The method of claim 15, wherein the plurality of thermoelectric devices comprises a plurality of Peltier devices.

17. The method of claim 16, further comprising:
providing the heated fluid to a first vehicle component; and
providing the cooled fluid to a second vehicle component.

18. The method of claim 17, wherein the first and second vehicle component are included in one of a group consisting of: an environmental system, a payload area, a cryogenic system, an air exchanger, an avionics fan, and an air handler.

* * * * *